(12) United States Patent
Moir et al.

(10) Patent No.: US 12,345,068 B2
(45) Date of Patent: Jul. 1, 2025

(54) SELF-MAINTAINING HOT TUB OR SPA

(71) Applicant: Sundance Spas, Inc., Chino, CA (US)

(72) Inventors: Erica Aloisia Moir, Santa Ana, CA (US); Brian Pierson, Beaverton, OR (US); Larry R Ovalle, Glendora, CA (US)

(73) Assignee: Sundance Spas, Inc., Chino, CA (US)

( * ) Notice: Subject to any disclaimer, the term of this patent is extended or adjusted under 35 U.S.C. 154(b) by 20 days.

(21) Appl. No.: 18/056,190

(22) Filed: Nov. 16, 2022

(65) Prior Publication Data

US 2023/0160226 A1 May 25, 2023

Related U.S. Application Data

(60) Provisional application No. 63/304,113, filed on Jan. 28, 2022, provisional application No. 63/264,359, filed on Nov. 19, 2021.

(51) Int. Cl.
*E04H 4/12* (2006.01)
*C02F 1/74* (2023.01)
*C02F 103/42* (2006.01)

(52) U.S. Cl.
CPC ............ *E04H 4/1209* (2013.01); *C02F 1/74* (2013.01); *C02F 2103/42* (2013.01)

(58) Field of Classification Search
CPC ........ A61H 2033/0012; A61H 2033/021–023; A61H 2033/141; A61H 2201/102;
(Continued)

(56) References Cited

U.S. PATENT DOCUMENTS 3,545,731 A    12/1970   McManus
3,880,965 A     4/1975   Dudis et al.
(Continued)

FOREIGN PATENT DOCUMENTS

BR   10-2016-006081 A2   9/2017
CN         1972738 A    5/2007
(Continued)

OTHER PUBLICATIONS

Acinti, Innovative Technologies for ultrafine bubble generation, (2017).
(Continued)

*Primary Examiner* — David P Angwin
*Assistant Examiner* — Nicholas A Ros
(74) *Attorney, Agent, or Firm* — Knobbe, Martens, Olson & Bear, LLP

(57) ABSTRACT

An immersion structure (e.g., hot tub, spa, swim spa, pool, showerhead, whirlpool bathtub, and whirlpool bath) has a water treatment system that includes a nano bubble generator for purifying the water. The water treatment system can further include a gas generator that works in conjunction with the nano bubble generator to create a composition of liquid containing nano bubbles. The nano bubbles circulate in the immersion structure thereby cleaning the plumbing system and water. The water treatment system can be located within a cabinet housing the immersion structure. The system can be controlled (e.g., water treatment, operational parameters, cleaning boost, part replacement, etc.) by a user via a smart app on a client device.

22 Claims, 11 Drawing Sheets

(58) Field of Classification Search
CPC .......... A61H 33/02–028; A61H 33/087; A61H 33/14–141; E03C 1/046; E04H 4/1209
See application file for complete search history.

(56) References Cited

U.S. PATENT DOCUMENTS

| | | | |
|---|---|---|---|
| 4,743,405 A | 5/1988 | Durao et al. | |
| 4,752,383 A | 6/1988 | Mckay et al. | |
| 4,829,008 A | 5/1989 | Zaromb | |
| 4,954,179 A | 9/1990 | Franninge | |
| 4,971,731 A | 11/1990 | Zipperian | |
| 5,090,352 A | 2/1992 | Horton | |
| 5,314,644 A | 5/1994 | Michelsen et al. | |
| 5,451,104 A | 9/1995 | Kleen et al. | |
| 5,665,228 A * | 9/1997 | Leaverton | A61H 33/60 210/195.1 |
| 6,017,022 A | 1/2000 | Shirtum | |
| 6,171,488 B1 | 1/2001 | Morse et al. | |
| 6,382,601 B1 | 5/2002 | Ohnari | |
| 7,329,343 B1 * | 2/2008 | Barnes | B01F 25/31421 204/660 |
| 7,338,551 B2 | 3/2008 | Kozyuk | |
| 7,419,143 B2 | 9/2008 | Lee et al. | |
| 7,488,416 B2 * | 2/2009 | Chen | E04H 4/1209 4/538 |
| 7,854,791 B2 | 12/2010 | Pellegrin | |
| 7,874,546 B2 | 1/2011 | Park et al. | |
| 7,884,335 B2 | 2/2011 | Hallam et al. | |
| 7,913,984 B2 | 3/2011 | Noguchi et al. | |
| 7,997,563 B2 | 8/2011 | Abe et al. | |
| 8,322,634 B2 | 12/2012 | Cunningham et al. | |
| 8,414,839 B1 * | 4/2013 | Barnes | C02F 1/78 422/186.12 |
| 8,419,934 B1 | 4/2013 | Robinson | |
| 8,445,546 B2 | 5/2013 | Wood et al. | |
| 8,505,575 B2 | 8/2013 | Chen et al. | |
| 8,557,112 B2 | 10/2013 | Takabatake et al. | |
| 8,585,022 B2 | 11/2013 | Lee | |
| 8,646,759 B2 | 2/2014 | Cunningham et al. | |
| 8,678,356 B2 | 3/2014 | Iwaki et al. | |
| 8,789,216 B2 | 7/2014 | Sorensen et al. | |
| 8,821,160 B2 | 9/2014 | Choi | |
| 9,061,255 B2 | 6/2015 | Song et al. | |
| 9,205,022 B2 | 12/2015 | Huang et al. | |
| 9,327,251 B2 | 5/2016 | Li | |
| 9,475,011 B2 | 10/2016 | Cunningham et al. | |
| 9,731,252 B2 | 8/2017 | Ikeda | |
| 9,802,165 B2 | 10/2017 | Peyman et al. | |
| 9,908,089 B2 | 3/2018 | Kim et al. | |
| 9,974,709 B2 | 5/2018 | Brett | |
| 9,981,229 B2 | 5/2018 | Matsunaga et al. | |
| 10,024,578 B1 * | 7/2018 | Rutkai | E04H 4/129 |
| 10,232,329 B2 | 3/2019 | Okano et al. | |
| 10,265,665 B2 | 4/2019 | Lin | |
| 10,293,312 B2 | 5/2019 | Goi | |
| 10,350,314 B2 | 7/2019 | Kvaale et al. | |
| 10,377,651 B2 | 8/2019 | Bauer et al. | |
| 10,477,883 B2 | 11/2019 | Giardino et al. | |
| 10,591,231 B2 | 3/2020 | Russell et al. | |
| 10,596,528 B2 | 3/2020 | Nakao | |
| 10,598,447 B2 | 3/2020 | Russell et al. | |
| 10,646,835 B2 | 5/2020 | Jinno et al. | |
| 10,792,628 B2 | 10/2020 | Stevens | |
| 10,864,486 B2 | 12/2020 | Ladouceur | |
| 10,874,260 B2 * | 12/2020 | Kownacki | A47K 3/02 |
| 10,874,585 B1 | 12/2020 | Vo | |
| 10,874,996 B2 | 12/2020 | Tsuchiya et al. | |
| 10,875,803 B1 * | 12/2020 | Guoin | C02F 1/44 |
| 10,912,710 B2 * | 2/2021 | Chiu | B01F 23/23231 |
| 10,941,062 B2 | 3/2021 | Kang | |
| 10,943,179 B2 | 3/2021 | Bauer | |
| 10,974,212 B1 | 4/2021 | Guoin et al. | |
| 11,472,727 B2 * | 10/2022 | Van Riper | C02F 1/78 |
| 2007/0095937 A1 | 5/2007 | Noguchi et al. | |
| 2008/0189847 A1 | 8/2008 | Yamasaki et al. | |
| 2008/0243094 A1 | 10/2008 | Yamasaki et al. | |
| 2009/0152381 A1 | 6/2009 | Kikuchi | |
| 2009/0201761 A1 | 8/2009 | Matsuno et al. | |
| 2010/0175181 A1 * | 7/2010 | Chen | B01F 25/422 4/541.5 |
| 2011/0220229 A1 | 9/2011 | Chen et al. | |
| 2011/0241230 A1 | 10/2011 | Keroff | |
| 2013/0063602 A1 | 3/2013 | Scapier | |
| 2014/0059759 A1 * | 3/2014 | DuHack | A61H 33/6078 4/494 |
| 2014/0191425 A1 | 7/2014 | Yano et al. | |
| 2015/0141741 A1 * | 5/2015 | Sullivan | A61M 21/02 600/26 |
| 2015/0314248 A1 * | 11/2015 | Castellote | B01F 23/23105 261/36.1 |
| 2017/0120202 A1 | 5/2017 | Schmidt et al. | |
| 2018/0333687 A1 | 11/2018 | Eda et al. | |
| 2019/0083945 A1 | 3/2019 | Zhang et al. | |
| 2019/0111459 A1 | 4/2019 | Earthman et al. | |
| 2019/0118142 A1 | 4/2019 | Earthman et al. | |
| 2019/0232238 A1 | 8/2019 | Goi | |
| 2019/0344224 A1 | 11/2019 | Griffiths et al. | |
| 2020/0029583 A1 | 1/2020 | Garwoord | |
| 2020/0045997 A1 | 2/2020 | Blevins | |
| 2020/0156018 A1 | 5/2020 | Kiriishi | |
| 2020/0238230 A1 | 7/2020 | Fujita et al. | |
| 2020/0324256 A1 | 10/2020 | Goi | |
| 2021/0038031 A1 | 2/2021 | Kownacki et al. | |
| 2021/0046435 A1 | 2/2021 | Blevins et al. | |
| 2021/0106957 A1 | 4/2021 | Tsuchiya | |
| 2021/0138410 A1 | 5/2021 | Yoshiaki et al. | |
| 2021/0146320 A1 | 5/2021 | Yukihiro | |
| 2021/0299617 A1 | 9/2021 | Scholten et al. | |

FOREIGN PATENT DOCUMENTS

| | | |
|---|---|---|
| CN | 100537007 C | 9/2009 |
| CN | 201493059 U | 6/2010 |
| CN | 101804309 B | 8/2012 |
| CN | 102976430 A | 3/2013 |
| CN | 102424443 B | 7/2013 |
| CN | 103790404 A | 5/2014 |
| CN | 105169980 B | 6/2017 |
| CN | 207137714 U | 3/2018 |
| CN | 20740954 U | 5/2018 |
| CN | 108671778 A | 10/2018 |
| CN | 110193297 A | 3/2019 |
| CN | 208599507 U | 3/2019 |
| CN | 109876684 A | 6/2019 |
| CN | 110015710 A | 7/2019 |
| CN | 110090569 A | 8/2019 |
| CN | 209631007 U | 11/2019 |
| CN | 111346589 A | 6/2020 |
| CN | 111729523 A | 10/2020 |
| CN | 109224895 B | 2/2021 |
| CN | 109012445 B | 5/2021 |
| CN | 113023913 A | 6/2021 |
| DE | 20201510219 U | 5/2015 |
| EP | 1754529 A1 | 2/2007 |
| EP | 2116589 A1 | 11/2009 |
| EP | 1754529 B1 | 4/2014 |
| EP | 2995369 A1 | 3/2016 |
| EP | 3056473 A1 | 8/2016 |
| EP | 2818805 B1 | 9/2017 |
| EP | 3170490 B1 | 11/2017 |
| EP | 3747534 A1 | 12/2020 |
| ES | 2457752 T3 | 4/2014 |
| ES | 1146592 U | 11/2015 |
| GR | 1008522 B | 7/2015 |
| IN | 2017-41039017 A | 11/2017 |
| JP | 2005115596 A | 4/2005 |
| JP | 2006514024 A | 3/2008 |
| JP | 2008132437 A | 6/2008 |
| JP | 2008178440 A | 8/2008 |
| JP | 2008246360 A | 10/2008 |
| JP | 2008246361 A | 10/2008 |
| JP | 2008296095 A | 12/2008 |
| JP | 2009072649 A | 4/2009 |

(56) References Cited

FOREIGN PATENT DOCUMENTS

| | | |
|---|---|---|
| JP | 2009082903 A | 4/2009 |
| JP | 2009195887 A | 9/2009 |
| JP | 2009254984 A | 11/2009 |
| JP | 3162162 U | 8/2010 |
| JP | 2011147907 A | 8/2011 |
| JP | 4869922 B2 | 2/2012 |
| JP | 2012250138 A | 12/2012 |
| JP | 5252409 B | 7/2013 |
| JP | 2013146714 A | 8/2013 |
| JP | 5423774 B2 | 2/2014 |
| JP | 2014226616 A | 12/2014 |
| JP | 5669173 B2 | 2/2015 |
| JP | 6210846 B2 | 10/2017 |
| JP | 2020104087 A | 7/2020 |
| JP | 6809671 B2 | 12/2020 |
| JP | 6844997 B2 | 3/2021 |
| KR | 100852465 | 8/2008 |
| KR | 2009-0094413 A | 9/2009 |
| KR | 2009-0116123 A | 11/2009 |
| KR | 10-0989779 B1 | 10/2010 |
| KR | 2011-0125327 A | 11/2011 |
| KR | 10-1126320 B1 | 3/2012 |
| KR | 10-1188635 B1 | 10/2012 |
| KR | 101188644 | 10/2012 |
| KR | 10-1214541 B1 | 1/2013 |
| KR | 10-1235663 B1 | 2/2013 |
| KR | 2014-0101212 A | 8/2014 |
| KR | 10-1440535 B1 | 9/2014 |
| KR | 2016-0147095 A | 12/2016 |
| KR | 2016-0147096 A | 12/2016 |
| KR | 2017-007614 A | 1/2017 |
| KR | 2017-0093299 A | 8/2017 |
| KR | 2017-0093304 A | 8/2017 |
| KR | 10-1826124 B1 | 2/2018 |
| KR | 2018-0026130 A | 3/2018 |
| KR | 2018-0038827 A | 4/2018 |
| KR | 2018-0038828 A | 4/2018 |
| KR | 2018-0038829 A | 4/2018 |
| KR | 10-1869487 B1 | 7/2018 |
| KR | 10-1877506 B1 | 8/2018 |
| KR | 10-1899725 B1 | 9/2018 |
| KR | 2018-0114461 A | 10/2018 |
| KR | 2018-0114462 A | 10/2018 |
| KR | 2018-0131664 A | 12/2018 |
| KR | 2019-0059724 A | 5/2019 |
| KR | 2019-0059725 A | 5/2019 |
| KR | 2019-0074708 A | 6/2019 |
| KR | 2019-0105419 A | 9/2019 |
| KR | 2019-0105420 A | 9/2019 |
| KR | 2019-0111645 A | 10/2019 |
| KR | 2020-0028613 A | 3/2020 |
| KR | 10-2098943 B1 | 5/2020 |
| KR | 2020-0058237 A | 5/2020 |
| KR | 2020-0058238 A | 5/2020 |
| KR | 2020-0074578 A | 6/2020 |
| KR | 2020-0074579 A | 6/2020 |
| KR | 2020-0111052 A | 9/2020 |
| KR | 2020-0112727 A | 10/2020 |
| KR | 10-2215906 B1 | 2/2021 |
| SG | 2013055967 A | 2/2015 |
| TW | I 263494 B | 10/2006 |
| TW | I 418343 B | 12/2013 |
| WO | WO 2002036252 A1 | 10/2002 |
| WO | WO 2005115596 A1 | 12/2005 |
| WO | WO 2006000170 A1 | 1/2006 |
| WO | WO 2008065652 A2 | 6/2008 |
| WO | WO 2008147050 A1 | 12/2008 |
| WO | WO 2009116711 A1 | 9/2009 |
| WO | WO 2010018261 A1 | 2/2010 |
| WO | WO 2010078442 A2 | 7/2010 |
| WO | WO 2011042616 A1 | 4/2011 |
| WO | WO 2011129775 A1 | 10/2011 |
| WO | WO 2014148397 A1 | 9/2014 |
| WO | WO 2014184585 A2 | 11/2014 |
| WO | WO 2016178436 A1 | 11/2016 |
| WO | WO 2017096444 A1 | 6/2017 |
| WO | WO 2017156410 A1 | 9/2017 |
| WO | WO 2019037759 A1 | 2/2019 |
| WO | WO 2020028646 A1 | 2/2020 |
| WO | WO 2020079020 A1 | 4/2020 |
| WO | WO 2020177753 A1 | 9/2020 |
| WO | WO 2020189880 A1 | 9/2020 |
| WO | WO 2020222388 A1 | 11/2020 |
| WO | WO 2021066205 A1 | 4/2021 |
| WO | WO 2021071072 A1 | 4/2021 |

OTHER PUBLICATIONS

Inopt, "Ceramic Nanofiltration", 2021, retrieved from http://rauschert.com.
Inopt, "Membranes", 2021, retrieved from http://rauschert.com.
Jameson, "Chemical Engineering Research and Design", Institution of Chemical Engineers, 1993, vol. 71, No. A6, ISSN 0263-8762.
Xcaret, "Water park solves algae issue with nanobubble technology", 2019, retrieved from Molear.com.

* cited by examiner

SELF-MAINTAINING HOT TUB OR SPA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to U.S. Provisional Patent Application No. 63/264,359, filed Nov. 19, 2021, and U.S. Provisional Patent Application No. 63/304,113, filed Jan. 28, 2022, all of which are hereby incorporated by reference in their entirety.

TECHNICAL FIELD

The present invention relates generally to a self-maintaining hot tub or spa. More specifically, the hot tub or spa includes a generator device which generates nano bubbles for cleaning water in the hot tub or spa. Attributes of nano bubbles (e.g., stability, surface charge, neutral buoyancy, scarification, oxidation, etc.) allow the nano bubbles to treat the water and/or surfaces in the absence of chemicals. Some embodiments include the incorporation of ozone gas and/or UV in partnership with the nano bubbles.

BACKGROUND

A conventional immersion structure (e.g., hot tubs, spas, swim spas, whirlpool bathtubs, basin of water, pool, showerhead, and whirlpool baths) includes a plumbing system and at least one pump that cooperate to circulate water between a water intake and jets positioned under the water level of the immersion structure. In many immersion structures, air from an adjustable air valve or other ventilating system is mixed with the water circulated through jets or nozzles to increase impingement thereof on the body. Water in the immersion structure can be kept over a period of time and reused. The reuse of the water can lead to fluctuations in the cleanliness of the water and surfaces of the immersion structure and plumbing system. Chemicals can be repeatedly added to the water in order to improve the quality of the water. However, users of the immersion structure are necessarily exposed to the added chemicals and can experience adverse reactions therefrom. Further, the chemicals can cause harm to the plumbing system and components of the immersions structures.

SUMMARY

According to some embodiments, the immersion structure (e.g., hot tubs, spas, swim spas, basin of water, pool, showerhead, whirlpool bathtubs, and whirlpool baths) described herein includes a water treatment system. In certain embodiments, the water treatment system includes a generator for generating nano bubbles which clean the water circulating within the immersion structure and/or clean the immersion structure itself.

In certain embodiments, the water treatment system is integrated into a plumbing system of the immersion structure to clean and purify the water and/or surfaces within the plumbing system. This can reduce the need for chemical sanitizers and allow the immersion structure to be self-maintaining.

In certain embodiments, the water treatment system can maintain a drinking level quality of the water and decrease the time needed to clean or purify the water after the immersion structure is used.

In certain embodiments, the water treatment system maintains visibly clear water by both killing bacteria but also because nano bubbles are not visible to the naked eye. In certain embodiments, the immersion structure can be odor free and generate reduced amounts of off-gas during use and when covered. Further, since fluctuations in water quality (e.g., pH, alkalinity levels, etc.) are reduced by the water treatment systems disclosed herein, the need for user maintenance is also reduced. User intervention to balance the need for draining and filling the immersion structure versus chemically shocking the water can be reduced or eliminated.

According to some embodiments, a self-maintaining hot tub or spa includes a shell forming a receptacle sized and shaped to hold water and a plumbing system comprising a nano bubble generator. The plumbing system can be configured to circulate the water between the receptacle and at least the nano bubble generator. The nano bubble generator can be configured to create and inject a plurality of nano bubbles into the plumbing system.

A variation of the aspect above is, wherein the plurality of nano-bubbles produce hydroxyl radicals.

A variation of the aspect above is, wherein the plurality of nano-bubbles comprises ozone.

A variation of the aspect above is, wherein the nano bubbles have a density of at least 0.2% and/or less than or equal to 0.7% of ozone by weight.

A variation of the aspect above is, wherein the plurality of nano-bubbles have a mean diameter of less than 1 microns.

A variation of the aspect above is, wherein the nano bubbles have a mean diameter less than 200 nm.

A variation of the aspect above is, wherein the nano bubbles have a mean diameter less than 500 nm.

A variation of the aspect above is, wherein the nano bubbles have a mean diameter ranging from about 10 nm to about 500 nm.

A variation of the aspect above is, wherein the nano bubbles have a mean diameter ranging from about 75 nm to about 200 nm.

A variation of the aspect above is, wherein the plurality of nano-bubbles do not coalesce for more than 1 hour.

A variation of the aspect above is, wherein the plumbing system further comprises an ozone generator, and wherein the ozone generator is configured to provide ozone to the nano bubble generator, the plurality of nano bubbles comprising the ozone.

A variation of the aspect above is, wherein the ozone generator has a flow rate of at least 0.3 SCFH and/or less than or equal to 1.5 SCFH, for example between 0.3 SCFH and 0.7 SCFH.

A variation of the aspect above is, wherein the ozone generator provides 40 to 100 mg/hr of ozone.

A variation of the aspect above is, wherein the plumbing system further comprises a UV system configured to sanitize the water before the water enters the nano-bubble generator.

A variation of the aspect above is, wherein the UV system is disposed in the plumbing system directly upstream from the nano bubble generator.

A variation of the aspect above is, wherein the nano bubbles in the water have a concentration of at least $1 \times 10^6$ nano-bubbles/ml.

A variation of the aspect above is, wherein the nano bubbles are stable in the water for at least one month under ambient pressure and temperature.

A variation of the aspect above is, wherein the nano bubble are filled with a gas.

A variation of the aspect above is, wherein the gas has a pressure of at least 3 PSI and/or less than or equal to 12 PSI.

A variation of the aspect above is, wherein, the gas is selected from the group consisting of air, oxygen, ozone, carbon dioxide, nitrogen, hydrogen, mineral gas, and combinations thereof.

A variation of the aspect above is, wherein the gas comprises one or more additives.

A variation of the aspect above is, wherein the one or more additives are selected from the group consisting of minerals, nutrients, and aromatherapy scents or oils.

A variation of the aspect above further comprises a recirculation pump configured to pump water through the nano bubble generator.

A variation of the aspect above is, wherein the recirculation pump has a flow rate of at least 14 gallons per minute and/or less than or equal to 20 gallons per minute.

A variation of the aspect above further comprises one or more jets disposed in the receptacle.

A variation of the aspect above further comprises a cabinet housing the shell.

A variation of the aspect above further comprises a control system having one or more sensors configured to measure one or more of a water quality parameter or a concentration of nano bubbles in the water.

A variation of the aspect above is, wherein the nano bubble generator comprises a gas-permeable member.

A variation of the aspect above is, wherein the gas-permeable member comprises a rigid, ceramic member.

A variation of the aspect above is, wherein the gas-permeable member comprises a porous sidewall having a mean pore size ranging from 0.0009 µm to 1 µm.

A variation of the aspect above further comprises a control system having one or more sensors configured to monitor performance of the nano bubble generator.

A variation of the aspect above is, wherein the plumbing system further comprises an ozone generator, and wherein the ozone generator can be configured to provide ozone to the nano bubble generator, the plurality of nano bubbles comprising the ozone.

A variation of the aspect above is, wherein the one or more sensors comprises a pressure sensor that can be configured to measure a pressure of zone entering the nano bubble generator.

A variation of the aspect above is, wherein the control system can be configured to issue an alert when the sensor measures a drop in the pressure, the alert can be indicative of a failure in water treatment.

A variation of the aspect above is, wherein the control system can be configured to issue an alert when the pressure falls below 9 PSI.

According to some embodiments, an immersion structure includes a receptacle sized and shaped to hold water and a plumbing system comprising a nano bubble generator. The plumbing system can be configured to circulate the water between the receptacle and at least the nano bubble generator. The nano bubble generator being configured to create and inject a plurality of nano bubbles into the plumbing system. The structure can further include a control system configured to measure at least one of (1) a water quality parameter or (2) a concentration of nano bubbles in the water and adjust one or more operating parameters of the plumbing system based on the measurement to improve cleaning efficiency.

A variation of the aspect above is, wherein the immersion structure is a hot tub.

A variation of the aspect above is, wherein the immersion structure is a swim spa.

According to some embodiments, a water quality monitoring and treatment system for remotely monitoring operation of an immersion structure that includes at least a nano-bubble generator includes a monitoring system configured to receive sensor data indicative of an operational status of the nano-bubble generator, a treatment algorithm configured to identify outcomes for the nano-bubble generator based on changes in one or more operational parameters for the immersion structure, a control system configured to change the one or more operational parameters based at least in part on the treatment algorithm, and a communication network configured to facilitate data transfer between the control system and a client device, the transferred data comprising at least the sensor data, and wherein the client device is configured to receive input from a user.

A variation of the aspect above is, wherein the treatment algorithm employs machine learning.

A variation of the aspect above is, wherein the communication network is wireless, and wherein at least some of the functionality of the control system or the treatment algorithm is disposed on the client device.

A variation of the aspect above is, wherein a smart app is configured to perform at least some of the functionality of the control system or the treatment algorithm.

A variation of the aspect above is, wherein the smart app is configured to run on the client device.

According to some embodiments, a container is configured to couple to a port of a plumbing system for an immersion structure. The plumbing system comprises a nano bubble generator configured to create and inject a plurality of nano bubbles into the plumbing system. The container comprises a receptacle configured to store an additive for injecting into the plurality of nano bubbles and an opening configured to releasably connect to the port so as to allow the additive to be injected into the nano bubbles.

A variation of the aspect above is, wherein the additive is a mineral.

A variation of the aspect above is, wherein the additive is a nutrient.

A variation of the aspect above is, wherein the additive is an aromatherapy scent or oil.

DETAILED DESCRIPTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
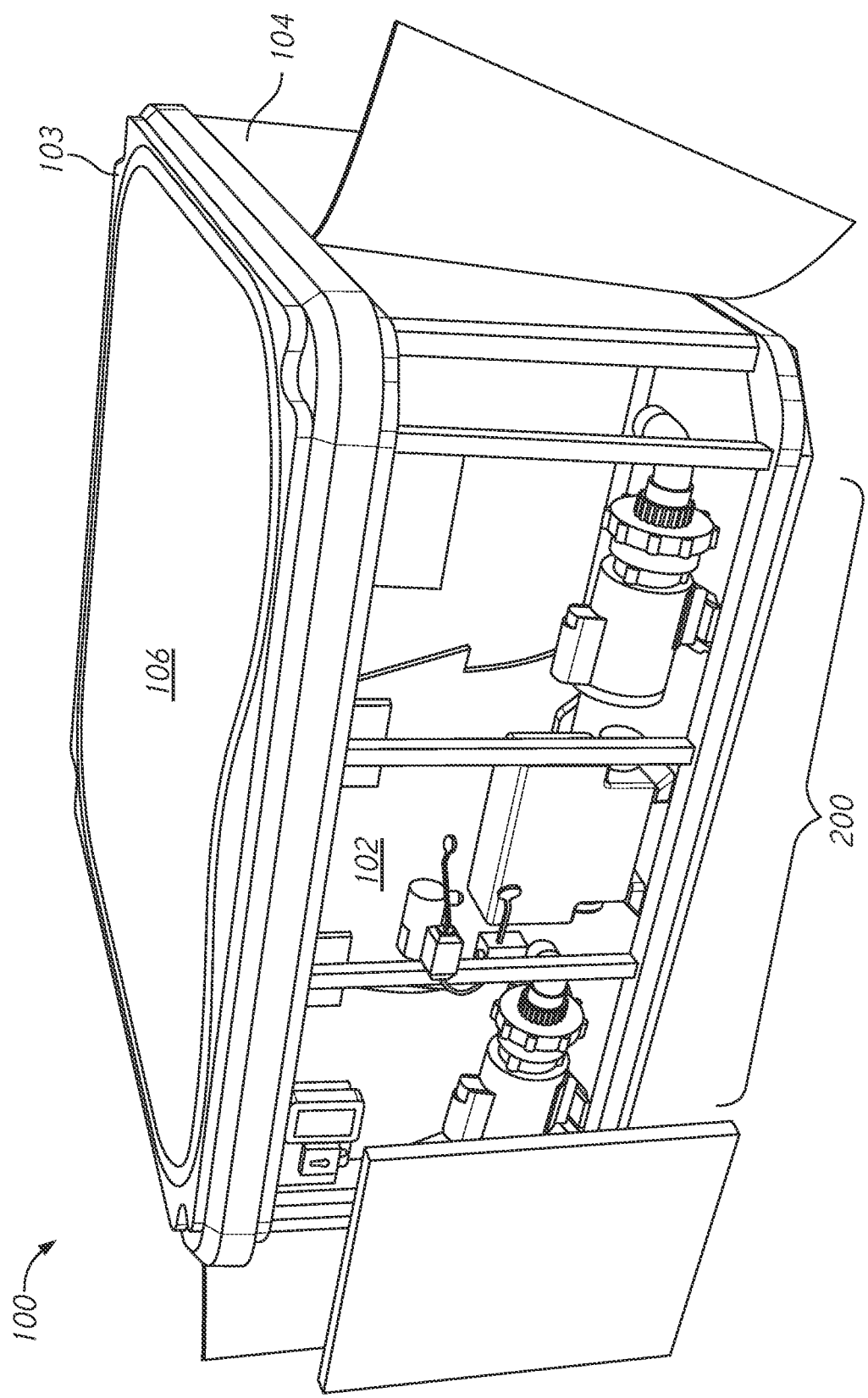
FIG. 1 depicts a perspective view of an exemplary immersion structure in the form of a hot tub that includes a water treatment system contained in a cabinet, according to an embodiment of the present invention.

FIG. 1 depicts a perspective view of an exemplary immersion structure 100 (e.g., hot tub, spa, swim spa, basin of water, pool, showerhead, whirlpool bathtub, and whirlpool bath) that includes a water treatment system 102. The immersion structure 100 illustrated in FIG. 1 is a hot tub.

In certain embodiments, the water treatment system 102 comprises a nano bubble generator 304 which generates nano bubbles. As described further below, nano bubbles have several unique properties which are advantageous to water quality. For example, nano bubbles can be neutrally buoyant, negatively charged, and primed for oxidative reactions, enabling them to distribute oxygen throughout the water while removing water contaminants and pathogens. Their negatively charged surfaces allows the nano bubbles to have a long lifetime in the water. Nano bubbles can have high internal pressure which improve gas solubility into the water. One or more of these unique properties can allow the nano bubbles to efficiently treat the water within the immersion structure 100. Conversely, micro and macro bubbles do not exhibit these same properties. For example, micro and macro bubbles are larger in size and thus rise rapidly and burst at the water surface.

In certain embodiments, the immersion structure 100 comprises a shell 103 forming a basin or receptacle 106. As shown, the basin 106 includes a volume of circulating water and is large enough to accommodate one or more users therein.

In certain embodiments, the immersion structure 100 comprises a plumbing system 200. The plumbing system 200 can be in flow communication with the basin 106 so as to circulate water between the basin 106 and the water treatment system 102. In certain embodiments, the plumbing system 200 is housed in a cabinet 104. In certain embodiments, the basin 106 is located in the cabinet 104.

The water treatment system 102 may be implemented to clean and/or sanitize the water circulating in the immersion structure 100. In certain embodiments, the water treatment system 102 cleans the water contained within the basin 106. In certain embodiments, the plumbing system 200 pumps water thorough a variety of jet nozzles, waterfalls, or other inlet features that allow for the flow of water to enter the basin 106.

In the illustrated embodiment, the water treatment system 102 of the plumbing system 200 is contained in the cabinet 104. In such an embodiment, the water treatment system 102 is accessible and serviceable inside the cabinet 104. In other embodiments, the water treatment system 102 is disposed outside of the cabinet 104 but still in flow communication with the plumbing system 200.

Figure 2:
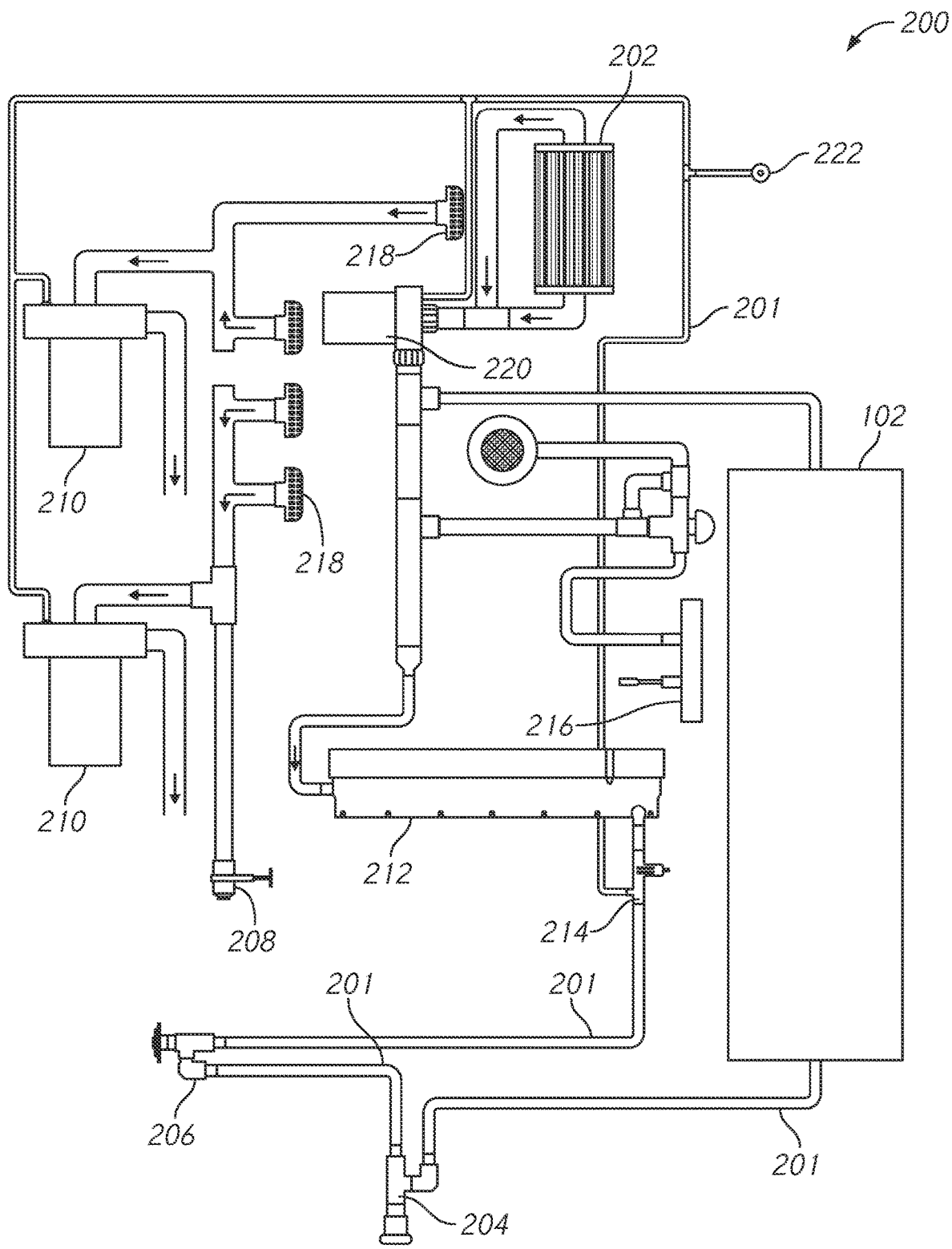
FIG. 2 depicts a schematic of a plumbing system from FIG. 1 that incorporates the water treatment system.

FIG. 2 depicts a schematic of the plumbing system 200 from FIG. 1 that incorporates the water treatment system 102. In certain embodiments, the plumbing system 200 comprises suction fittings 218 which pull water from the basin 106 and into the plumbing system 200. In the illustrated embodiment, the suction fittings 218 are in fluid communication with one or more pumps 210 within the plumbing system 200. The one or more pumps 210 can be configured to draw water from the basin 106 through a filter 202. In certain embodiments, the filter 202 helps clean and purify the water.

In certain embodiments, the plumbing system 200 comprises a circulation pump 220. In certain embodiments, the circulation pump 220 is in fluid communication downstream of the filter 202 and is used to increase the flow rate of the water upon leaving the filter 202. In some cases, the circulation pump 220 can have a flow rate of at least 10 gallons per minute and/or less than or equal to 25 gallons per minute, at least 12 gallons per minute and/or less than or equal to 23 gallons per minute, and/or at least 14 gallons per minute and/or less than or equal to 20 gallons per minute. The circulation pump 220 can operate 24 hours per day. In some cases, however, the circulation pump operates for less than 24 hours per day. In certain embodiments, the circulation pump 220 moves the water to one or more of the water treatment system 102, a waterfall 216, and/or a heater 212. For example, in certain embodiments, water that enters the water treatment system 102 is then returned to the basin 106 through a return 204. For example, in certain embodiments, water that is diverted to the waterfall 216 is returned to the basin 106 through the waterfall feature. For example, in certain embodiments, water that is diverted to the heater 212 is heated and returned to the basin 106 through the return 204. In certain embodiments, an exterior drain is attached to the flow line between the heater 212 and the heat return 204. The water circulating through the plumbing system 200 can, in some cases, have a temperature of at least 65° F. and/or less than or equal to 104° F. In some cases, the water can have a temperature of at least 70° F. and/or less than or equal to 102° F., at least 75° F. and/or less than or equal to 100° F., at least 80° F. and/or less than or equal to 98° F., and/or at least 85° F. and/or less than or equal to 95° F.

In certain embodiments, the plumbing system 200 comprises one or more flow lines 201. In certain embodiments, the flow line 201 transports water and can be configured as a pipe, tube, or channel. In certain embodiments, one or more of the above mentioned structures of the plumbing system 200 connects to the next structure via one or more flow lines 201.

In certain embodiments, the plumbing system 200 comprises a flow switch 214. In certain embodiments, the flow switch 214 is configured to control water flow between the exterior drain 206 and the heater 212. In this way, the flow switch 214 can divert water back to the circulation pump 220 and the one or more pumps 210.

In certain embodiments, the plumbing system 200 comprises an air bleed valve 222 located upstream of the circulation pump 220 and the one or more pumps 210. In certain embodiments, the air bleed valve 222 is configured to release trapped gas from the plumbing system 200.

Figure 3A:
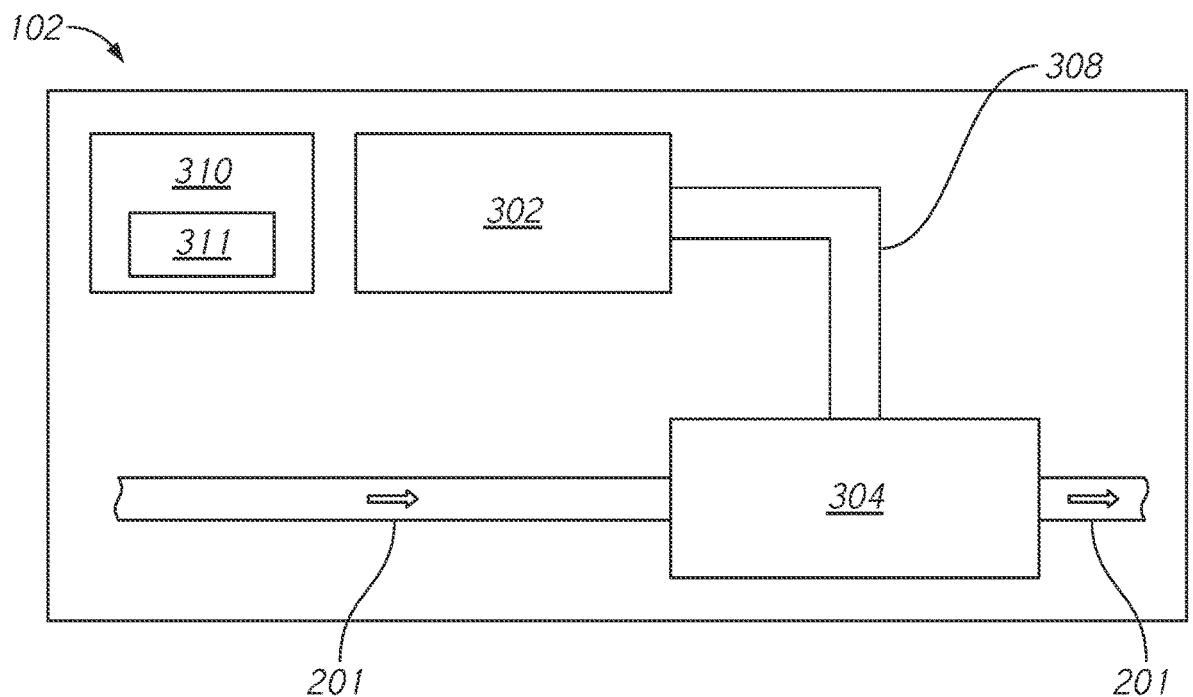
FIG. 3A depicts a schematic of an embodiment of the water treatment system from FIG. 1 that includes a gas generator and a nano bubble generator.

FIG. 3A depicts a schematic of an embodiment of the water treatment system 102 from FIG. 1 that includes a gas generator 302 and a nano bubble generator 304. In the illustrated embodiment, the nano bubble generator 304 is in flow communication with the gas generator 302 via a gas line 308. In the illustrated embodiment, water from the plumbing system 200 enters and leaves the nano bubble generator 304 via the flow line 201. As is explained in more detail below, the water exiting the nano bubble generator 304 is comprised of nano bubbles.

In certain embodiments, the nano bubbles are filed or injected with a gas (e.g., air, ozone, mineral gas, etc.). In certain embodiments, the gas can be selected to enhance the cleaning effect the nano bubbles have on the water. In certain embodiments, the gas can comprise one or more additives (e.g., minerals, nutrients, and/or aromatherapy scents or oils, etc.) to enhance the user's experience. In certain embodiments, the injection of certain minerals and/or nutrients within the nano bubbles can provide skin and/or health benefits to the user. For example, in certain embodiments, symptoms of skin conditions like psoriasis, acne, eczema, and dry scalp can be relieved by the skin absorbing the mineral and nutrients released by the nano bubbles. In certain embodiments, the minerals and/or nutrients within the nano bubbles can help improve vascular health by increasing blood circulation of the user. In certain embodiments, the minerals and/or nutrients within the nano bubbles can improve the user's metabolism. The injection of certain aromatherapy scents or oils within the nano bubbles can promote health and well-being of the user.

In certain embodiments, the additives (e.g., minerals, nutrients, and/or aromatherapy scents or oils, etc.) are provided to the user in one or more containers. The container can be configured for the user to simply couple the container to a port on the water treatment system 102 so as to allow the additive in the container to be injected into the nano bubbles. In certain embodiments, the port is disposed on a component water treatment system 102. In this way, when the additive in the container is consumed, the user can simply disengage the empty container from the port and then connect a new filled container.

In certain embodiments, the port is sized and shaped to engage containers of different additives. In certain embodiments, the port is sized and shaped to engage a specific container that contains a certain additives.

In certain embodiments, the water treatment system 102 comprises a plurality of ports to allow the user to connect more than one container at the same time. In certain embodiments, a first container can comprise a supplemental port for coupling a second container to the first container. In certain embodiments, the additive in the second container can enhance the beneficial effect of the additive from the first container. In certain embodiments, the additive in the second container is selected to flow into the first container before being injected into the nano bubbles. The order in which the additives are combined can be controlled so as to enhance a desired beneficial effect from the combination of the additives. In this way, the user experience can be enhanced by any desired combination of additives being injected into the nano bubbles.

Figure 3B:
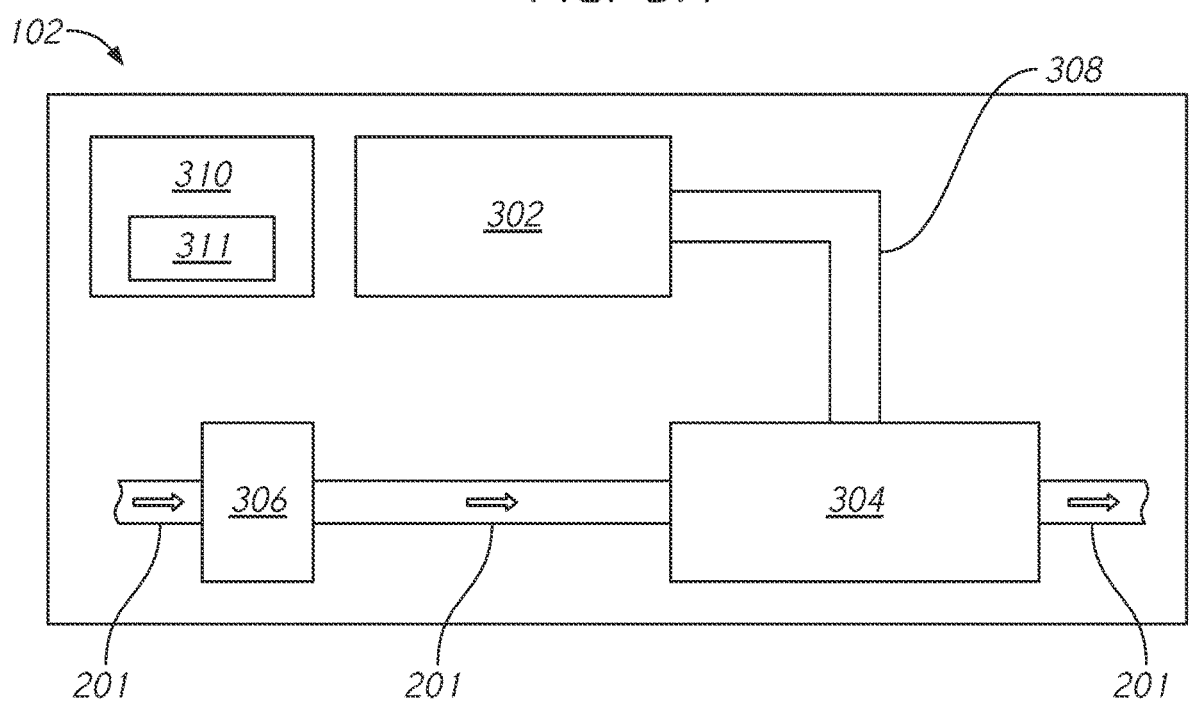
FIG. 3B depicts a schematic of an embodiment of the water treatment system from FIG. 1 that is similar to the embodiment illustrated in FIG. 3A but also includes a UV system disposed upstream of the nano bubble generator.

FIG. 3B depicts a schematic of an embodiment of the water treatment system 102 from FIG. 1 that is similar to the embodiment illustrated in FIG. 3A but also includes a UV system 306 disposed upstream of the nano bubble generator 304. Locating the UV system 306 upstream of the nano bubble generator 304 may delay exposure of the nano bubbles to the UV system 306. In the illustrated embodiment, the UV sanitizing system 306 is located upstream of the nano-bubble generator 304 but the disclosure is not so limited. For example, in other embodiments, the UV sanitizing system 306 is located downstream of the nano bubble generator 304 or in another location within the plumbing system 200.

In certain embodiments, the water treatment system 102 comprises a control system 310. The control system 310 can comprise one or more sensors or other means for measuring (1) one or more water quality parameter; (2) a concentration of nano bubbles in the water. In certain embodiments, the control system 310 may be either closed-loop or open. The one or more sensors can be positioned anywhere within the water treatment system 102, for example within the nano bubble generator 304, at an inlet of the nano bubble generator 304, in a flow path between a gas generator and the nano bubble generator 304, or any other positioned suitable for detecting the desired parameters. In certain embodiments, the one or more sensors detect a pressure change in the nano bubble generator 304, for example a pressure change in the incoming gas (e.g., air, oxygen, ozone, carbon dioxide, nitrogen, hydrogen, mineral gas, or combinations thereof). A pressure change may indicate the operational status of the nano bubble generator 304. For example, a pressure increase could indicate flow through the nano bubble generator 304 is not being treated and may alert the user to check the equipment for failures for example in the gas generator or check valves. A pressure decrease could indicate that pressure at the nano bubble generator 304 is not optimal for bubble generation and/or that water is flowing back to the bubble generator 304, which could indicate a failure in nano bubble treatment. A pressure change (e.g., of at least 1%, 2%, 3%, 4%, 5%, 6%, 7%, 8%, 9%, 10%, etc.) at the nano bubble generator 304 can cause the one or more sensors to alert the user to check the equipment. Optimal pressure and flow rate can beneficially prevent the bubbles generated by the bubble generator 304 from bursting and thus ensure proper operation of the bubble generator 304. Higher flow rates than those described herein may cause the nano bubbles to burst or prevent the gas from properly transferring to the nano bubbles. Thus, the one or more sensors may include flow sensors to monitor flow through the water treatment system, for example at or near the circulation pump or the bubble generator or at any location therebetween. In other embodiments, the flow sensor may be downstream from the bubble generator. In certain embodiments, a conductivity sensor monitors the operational status of the nano bubble generator 304. For example, the sensor could detect a change in the charge of the water as the water passes through the nano bubble generator 304.

In certain embodiments, the one or more sensors monitor one or more operating parameters (e.g., pressure, flow, timing, contact time that is needed to treat the water, output of ozone to treat the water, performance of the UV system 306) of the nano bubble generator 304 to ensure treatment meets performance criteria. In certain embodiments, cleaning performance of the water treatment system 102 can be improved by changing one or more of: contact time, flow rate, ozone output, and/or gas injection pressure. In certain embodiments, the control system 310 is configured to change one or more operating parameters of the plumbing system 200 in response to the one or more measurements.

In certain embodiments, the control system 310 communicates with an external local area network (LAN) or mobile carrier's network. In certain embodiments, the control system 310 includes a LAN module, a WiFi module and/or a cellular module. In certain embodiments, the control system 310 comprises an antenna. In certain embodiments, the Wi-Fi module connects the control system 310 to the LAN via a Wi-Fi connection.

In certain embodiments, the control system 310 comprises the cellular module. In certain embodiments, the cellular module communicates to the Internet via a mobile carrier's network. Depending on the location and carrier, various standards, such as GPRS, GSM, and CDMA, and the like may apply. In certain embodiments, the user controls the control system 310 from an Internet enabled user device via its web browser, custom software, or a dedicated application. Internet enabled user devices include tablets, smart phones, computers, laptops, tablets, and the like.

In certain embodiments, the user sends commands to a webpage on the internet enabled user device. In certain embodiments, the user interacts with a dedicated application running on their Internet enabled user device. In certain embodiments, the dedicated application is written for various platforms, such as iPhone, Android, or the like. The application then communicates with the control system 310. In this way, the user is able to monitor the operating parameters/condition of the plumbing system 200 (e.g., the nano bubble generator 304) as well as change one or more operating parameters.

In certain embodiments, the control system 310 comprises one or more controllers 311 (e.g. one or more microcontrollers). The one or more controllers 311 can be arrange on one or more printed circuit boards (PCB). For example, in certain embodiments, a controller 311 can be disposed on a motherboard and another controller 311 can be disposed on a daughterboard. In this way, the daughterboard can optionally plug into and extend the circuitry of the motherboard to accommodate additional components and/or functionality. In certain embodiments, the connection(s) between the daughterboard and the motherboard provides for the transmission of power, ground, and/or electrical signals.

In certain embodiments, the daughterboard can connect to an existing port (e.g., serial port for stereo connection, etc.) on the motherboard to function as a daughterboard to the motherboard. In certain embodiments, the existing port is available for connecting either the stereo (for example) or the nano bubble generator 304. In certain embodiments, the connection that was originally provided by the existing port (e.g., serial port for stereo connection, etc.) on the motherboard can be duplicated on the daughterboard. In this way, the connection (e.g., serial port for stereo connection, etc.) on the motherboard that is now being employed to connect the daughterboard is provided on the daughterboard. Continuing with this example, the serial port for the stereo connection becomes available on the daughterboard when the daughterboard is added to the motherboard. In this way, the stereo connection on the daughterboard can passthrough to the motherboard. Of course, the connection can be any type of connection (e.g., serial, USB, PCI, PCIe, AGP) for any type of functionality (stereo, water sensor, temp sensor, flow sensor, etc.). In certain embodiments, a dongle can be employed to electrically connect the motherboard to the daughterboard.

In certain embodiments, the one or more controllers 311 can be dedicated to operate/control certain components of the immersion structure 100. For example, in certain embodiments, a first controller 311 can be disposed on the daughterboard and configured to control one or more components of the immersion structure 100 (e.g., one or more of the nano bubble generator 304, gas generator 302, etc.). Continuing with this example, a second controller 311 can disposed on the motherboard and configured to control the one or more components of the immersion structure 100 not controlled by the first controller 311.

An advantage of employing a separate controller 311 on a daughterboard is to allow the user the option of adding certain components and their related functionalities to an existing immersion structure 100. For example, the nano bubble generator 304 and/or the gas generator 302 could be added to an existing immersion structure 100. A daughterboard could be added extending the circuitry of the motherboard to support a controller 311 dedicated to controlling the added component(s).

In certain embodiments, the nano bubble generator 304 requires an input voltage between 5 V and 12 V. In certain embodiments, the nano bubble generator 304 draws about 200 mA. Of course, the power requirements of the nano bubble generator 304 need not be the values listed above and can instead be any other values depending on the design and operation of the nano bubble generator 304.

In certain embodiments, the one or more controllers 311 communicate and/or control operation of the nano bubble generator 304. For example, in certain embodiments, the nano bubble generator 304 sends signal to the controller 311 when nanobubble generation stops or has an error condition. For example, an error may occur when the control system 310 determines a level of current being drawn by the nano bubble generator 304 drops below a predetermined or preset level. As explained below, in certain embodiments, the treatment algorithm 904 and/or the control system 310 informs or notifies the user that the nano bubble generator 304 is not working properly or is not working at an optimum level.

In certain embodiments, the control system 310 sends signals to the nano bubble generator 304 and the gas generator 302 to turn on during a filtration cycle for the immersion structure 100. In certain embodiments, the signals sent to the nano bubble generator 304 and the gas generator 302 include one or more operating parameters for the operation of the nano bubble generator 304 and/or the gas generator 302 during the filtration cycle.

In some cases, the filtration cycle includes one or more cycle modes. For example, the filtration cycle can include a first cycle mode where the nano bubble generator 304 and the gas generator 302 are turned on for or about 8 hours per day. In a second cycle mode, the nano bubble generator 304 and the gas generator 302 can be turned on for or about 12 hours per day. In a third cycle mode, the nano bubble generator 304 and the gas generator 302 can be turned on for or about 16 hours per day. The cycle modes can last less than or more than the periods above (e.g., less than or more than 8 hours, 12 hours, 16 hours). The on periods of any of the cycle modes can be continuous or non-continuous. For example, in a continuous mode, the nano bubble generator 304 and the gas generator 302 can be on for 8, 12, or 16 consecutive hours. In a non-continuous mode, the nano bubble generator 304 and the gas generator 302 can be turned on and off periodically throughout the day. Using the first cycle mode as an example, the nano bubble generator 304 and the gas generator 302 can be turned on for four 2-hour periods and turned off for four 4-hour periods. In the second cycle mode, the nano bubble generator 304 and the gas generator 302 can be turned on for four 3-hour periods and turned off for four 3-hour periods. In the third cycle mode, the nano bubble generator 304 and the gas generator 302 can be turned on for four 4-hour periods and turned off for four 2-hour periods. In the non-continuous mode, the duration and number of on and off periods can vary. For example, each cycle mode can include two or more on periods of the same or different duration and one or more off periods of the same or different duration.

In certain embodiments, the control system 310 sends signals to the nano bubble generator 304 and the gas generator 302 to turn off when pumps for the one or more jets 1002B are in operation. In certain embodiments, the control system 310 and/or components of the immersion structure 100 communicate via Modbus or any other communication protocol. As explained below, in certain embodiments, the system 900 communicates via Modbus (or any other communication protocol) to one or more IoT devices.

In certain embodiments, the control system 310 (e.g., a controller 311 for the immersion structure 100 or for the nano bubble generator 304) provides a counter of days of life remaining for the gas generator 302. As described below, the system 900 can display the days remaining to the user. In certain embodiments, preset consumer usage profiles (e.g., light user, heavy user, etc.) are used by the control system 310 to operate one or more components of the immersion structure 100.

Figure 4:
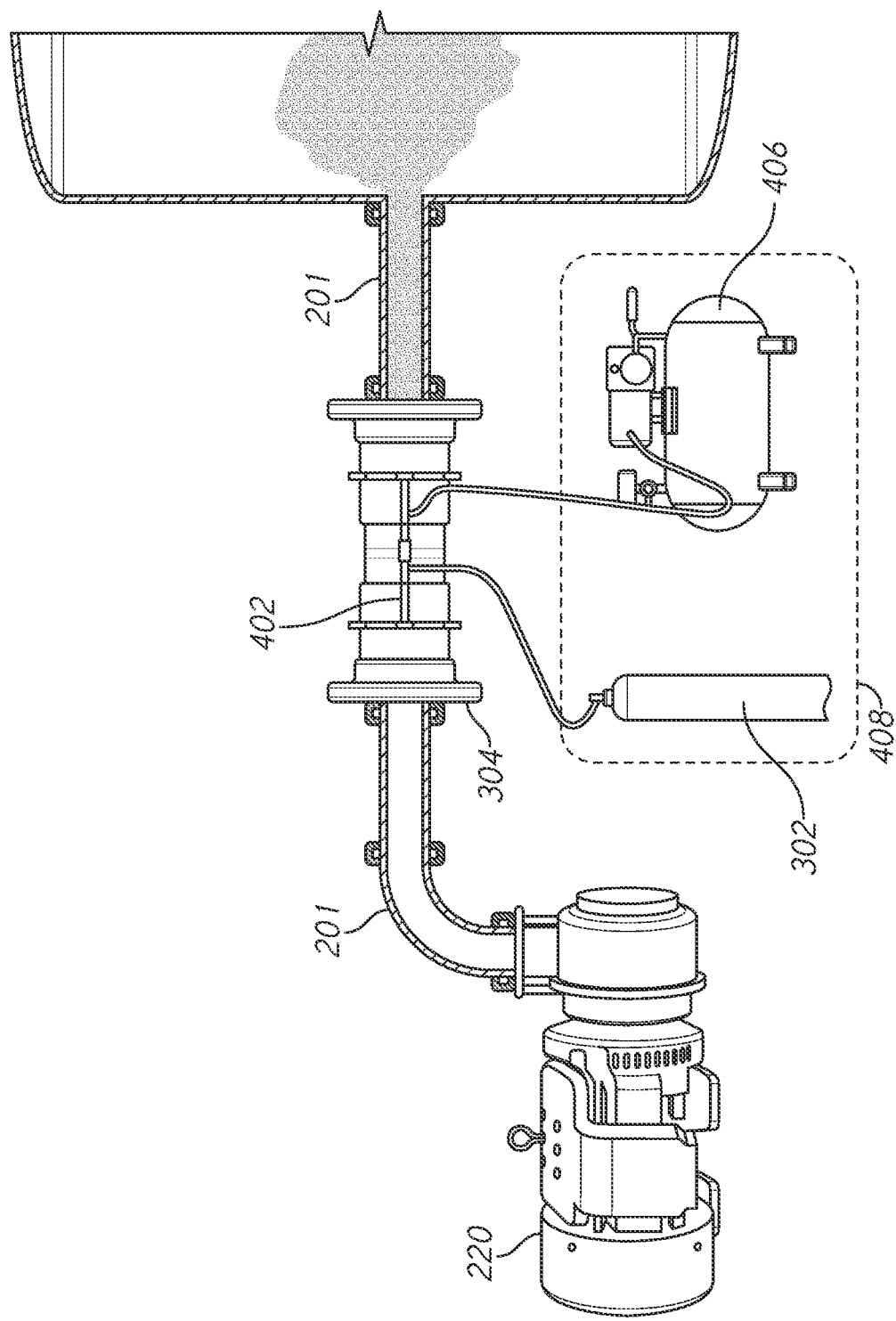
FIG. 4 depicts an illustration of the water treatment system from FIG. 1 when in use.

FIG. 4 depicts an illustration of the water treatment system 102 from FIG. 1 in use. In the illustrated embodiment, the nano bubble generator 304 is in-line with the circulation pump 220 and the flow line 201. In the illustrated embodiment, the gas generator 302 is embodied as a pressurized tank of the desired gas but is not so limited. In other embodiments, the gas generator 302 generates the desired gas via one or more chemical reactions. For example, in certain embodiments, the gas generator 302 creates ozone from ambient air by adding energy in the form an electrical charge to oxygen molecules in the ambient air.

In certain embodiments, the water treatment system 102 comprises a compressor 406 in flow communication with the nano bubble generator 304. In certain embodiments, the compressor 406 connects to gas inlet 402. In certain embodiments, the compressor 406 increases the pressure of the gas produced by the gas generator 302. In certain embodiments, the compressor 406 provides 0.5 liters per minute at 2 atm. In some cases, the compressor 406 provides at least 0.1 liters per minute and/or less than or equal to 2.5 liters per minute, at greater than or equal to 1 atm and/or less than or equal to 6 atm. Of course, the operational parameters of the compressor 406 are not limited to the listed values and can instead be any other values depending on the design and desired function of the compressor 406.

In certain embodiments, the compressor 406 and the gas generator 302 are disposed in a single enclosure 408. In certain embodiments, the single enclosure 408 includes connections for power and/or communication. In certain embodiments, the voltage required by the single enclosure 408 is 120 V or 240 V. In certain embodiments, the single enclosure 408 operates on 50 or 60 Hz. In certain embodiments, the gas generator 302 is designed so that any off-gassing does not exceed UL 1563 Standard for Electric Spas, Equipment Assemblies, and Associated Equipment.

In certain embodiments, the compressor 406 and the gas generator 302 are designed for an average life of 2 years of operation based on 12 hours of daily operation as assumed "normal" use. In certain embodiments, the single enclosure 408 comprises a wired connector (e.g., Molex) for connecting to components of the immersion structure 100.

In some embodiments, the gas generator 302 produces gas at a high enough pressure that the compressor 406 is not needed. Further, in other embodiments, the gas generator 302 functions to both produce and pressurize the gas entering the nano bubble generator 304.

Figure 5:
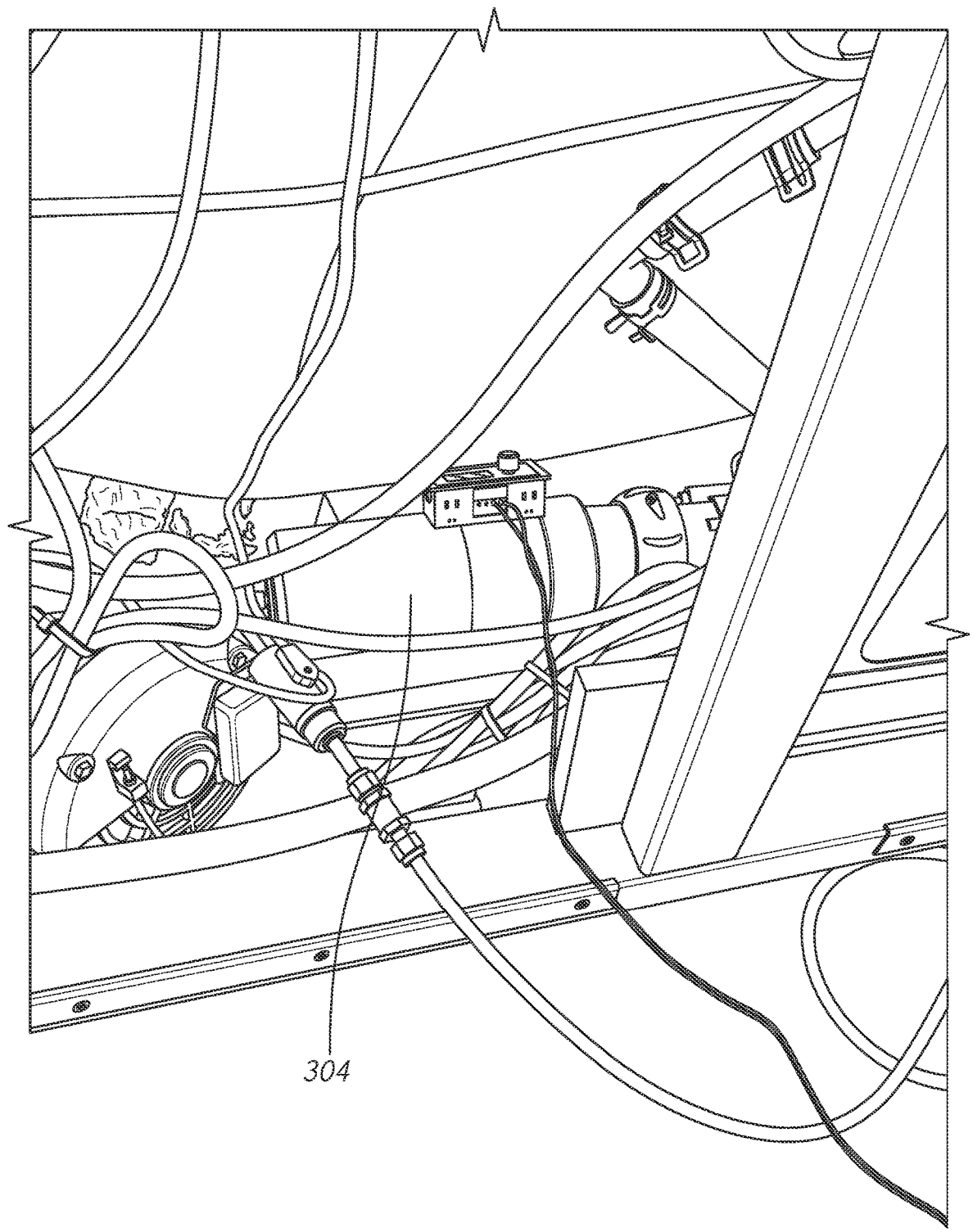
FIG. 5 is a picture of a portion of the plumbing system from FIG. 2 that includes the nano bubble generator of the water treatment system.

FIG. 5 is a picture of a portion of the plumbing system 200 from FIG. 2 that includes the nano bubble generator 304 of the water treatment system 102. As is illustrated, the water treatment system 102 fits into the cabinet 104 of the immersion structure 100 along with the rest of the plumbing system 200 so as to be easily accessible by the user. In some cases, the dimensions of the bubble generator 304 are such that allow the bubble generator 304 to fit into the cabinet 104. The bubble generator 304 can have a length dimension of less than for equal to about 20 inches, or less than or equal to about 15 inches, less than or equal to about 12 inches, for example about 10 in. The bubble generator 304 can have a width dimension of less than or equal to about 12 inches, less than or equal to about 10 inches, or less than or equal to about 8 inches, for example by about 6 in. In other embodiments, the water treatment system 102 may be located outside of the cabinet 104. The components of the water treatment system 102 may be detachably attached within the plumbing system 200 and replaceable as a serviceable part. In certain embodiments, the water treatment system 102 itself may be detachably attached to the plumbing system 200 and replaceable as a serviceable system.

Figure 6:
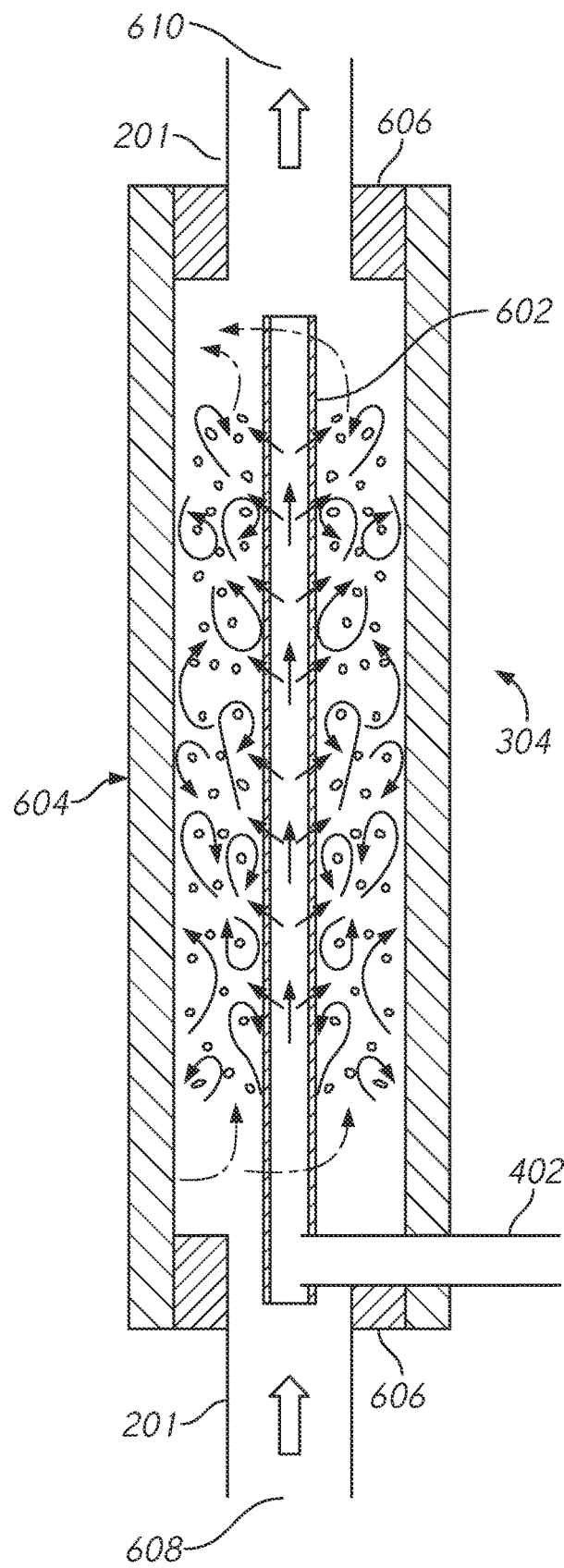
FIG. 6 is a schematic illustration of an exemplary cross-section through the nano-bubble generator from FIG. 5.

FIG. 6 is a schematic illustration of an exemplary embodiment of the nano bubble generator 304 from FIG. 5. In the illustrated embodiment, the nano bubble generator 304 includes a housing 604. In certain embodiments, the housing 604 can have a generally cylindrical outer shape. In certain embodiments, the nano bubble generator 304 comprises a tube 602 which will be described in more detail below. In the illustrated embodiment, the tube 602 spans between end walls 606 of the housing 604 and is rigidly supported within the housing 604. An exemplary embodiment of the nano bubble generator 304 is disclosed in U.S. Pat. No. 10,598,447 to Russell et al., which is incorporated by reference in its entirety as if fully set forth herein.

In certain embodiments, the flow line 201 is in fluid communication with each end wall 606 of the nano bubble generator 304. In this way, water entering the nano bubble generator 304 enters via the flow line 201 through inlet 608 and leaves through outlet 610. In certain embodiments, the circulation pump 220 is connected to the inlet 608. In certain embodiments, a pressure regulator is disposed between the circulation pump 220 and the inlet 608.

In certain embodiments, a pressurized source of the desired gas is connected via gas inlet 402 to the tube 602. In certain embodiments, the tube 602 preferably includes a rigid material adapted to maintain a constant pore size when filled with the pressurized gas. For example, the tube 602 can be made of a material having sufficient strength or wall thickness for maintaining a constant pore size when the pressurized gas is introduced into a lumen of the tube 602. In certain embodiments, having a constant pore size in the wall of the tube 602 can be beneficial for controlling the diameter range and mean diameter of the nano bubbles formed on the outer surface of the tube 602.

In certain embodiments, the tube 602 can be a commercially available single channel ceramic membrane coated with metallic oxides (such as alumina, titania, zirconia, manganese, or combinations thereof). The dimensions of the ceramic membrane is not limited to any form or size and can be in the form of a monolith, multichannel tubes, etc. In certain embodiments, a singular mean pore size of 0.9, 1, 3, 5, 10, 30, 70, 100, 200, 250, 400, 600, 800 and 1000 nm (0.0009-1.0 micron) can be employed depending on the size of the desired nano bubble. Examples of commercially available single channel ceramic membranes coated in either an $Al_2O_3$ or $TiO_2$ crystalline coating with a known mean pore size are those sold by Inopor GmbH. In certain embodiments, the tube can be one meter long, with a hollow lumen of at least 7 mm, and up to 36 mm, in some embodiments. In certain embodiments, an external diameter of the tube 602 can range from about 10 mm to about 42 mm. In certain embodiments, several tubes 602 can be contained within the housing 604 to increase nano bubble production. In certain embodiments, the tube 602 can be detachably mounted inside the housing 604 and replaced as a serviceable part. In certain embodiments, the liquid (e.g., water) is fed by the circulation pump 220 into the inlet 608.

As is illustrated in FIG. 6, the inlet 608 and the outlet 610 are parallel to the flow line 201. However, in other embodiments, the inlet 608 and/or the outlet 610 may not be parallel (e.g., skew, perpendicular, etc.) so as increase any turbulence of the water within the nano bubble generator 304. For example, in certain embodiments, the inlet 608 and/or the outlet 610 may be positioned perpendicular to a longitudinal axis of the tube 602 in order to force a circular or spiral motion of water around the tube 602. For example, in certain embodiments, the inlet 608 and/or the outlet 610 may be positioned tangential to the housing 604 to allow entry of the water into the housing 604 without significant losses and to generate a spiraling motion. The tube 602 and the housing 604 can also be arranged and spaced respectively to one another to prevent clogging of the water.

The size and shape of the nano bubble generator 304 is not limited to the cylindrical structure of the housing 604 as shown in FIG. 6. In some embodiments, the housing 604 can have a shape that forces a circular or spiral motion of the fluid around the tube 602. In other embodiments, the housing 604 can have a shaped that increases the turbulence of the water passing through, such as, but not limited to a box, pyramid, or other three dimensional shape.

The gas used in the nano bubble generator 304 to generate the nano bubbles can be any gas (e.g., oxygen, ozone, air, hydrogen, nitrogen, carbon dioxide, or combinations thereof). As the tube 602 is closed apart from at its inlet 402, the gas entering the tube 602 can only escape through the pores in the tube 602. In certain embodiments, a pressure differential is maintained between the gas pressure inside the tube 602 and the water pressure outside the tube 602 so that gas is forced through the pores of the tube 602. The gas emerges as nano bubbles into the flowing stream of water passing through the housing 604. The flowing stream of water carries away the nano bubbles as they form and before they coalesce into larger bubbles. In certain embodiments, the velocity of the liquid can be 2.0 m/s or greater (e.g., at least 2.0 m/s, or 3.0 m/s). In certain embodiments, the gas pressure inside the tube 602 is 5 PSI or above. In some cases, the gas pressure inside the tube 602 is at least about 3 PSI and/or less than or equal to 20 PSI, including values or ranges therebetween, for example between about 6 PSI and 18 PSI, between about 8 PSI and 16 PSI, between about 10 PSI and 16 PSI, between about 12 PSI and 16 PSI. The gas pressure inside the tube 602 can also be at least about 9 PSI and/or less than or equal to 12 PSI, including values or ranges therebetween. Beneficially, the gas pressure inside the tube 602 can maintain bubble generation and prevent bubbles from breaking up. The gas can have a humidity ranging from about 0% to or about 100% including values or ranges therebetween (e.g., about 10% to or about 90%, about 20% to or about 70%, about 30% to or about 60%, about 40% to or about 50%, etc.) and have a temperature of less than or equal to 120° F.

In certain embodiments, the water exiting the housing 604 includes nano bubbles having a mean diameter less than 1 micron. In certain embodiments, the created nano bubbles have a mean diameter ranging from about 10 nm to about 500 nm, about 75 nm to about 200 nm, or about 50 nm to about 150 nm, and other values between the listed values. In certain embodiments, the nano bubbles in the composition may have a unimodal distribution of diameters, where the mean bubble diameter is less than 1 micron.

In certain embodiments, the nano bubble generator 304 is capable of generating greater than 200 million nanobubbles per milliliter of water passing through.

In certain embodiments, the water treatment system 102 disclosed herein can produce compositions in which the water contains nano bubbles that remain stable over a desired time. In some embodiments, the nano bubbles are stable in the water for at least one month, and preferably at least 3 months, under ambient pressure and temperature. In certain embodiments, the smaller surface area and high solubility of the nano bubbles allows the nano-bubbles to be more efficient at transferring gases such as oxygen into the water than conventional aeration.

In certain embodiments, the nano bubbles purify the water due to the production of hydroxyl radicals, a reactive oxygen species. Hydroxyl radicals are formed when a nano bubble interacts with a stimulus, such as an external force, that causes the nano bubble to collapse. This stimulus could be UV, sunlight, aeration, mixing, etc. Hydroxyl radicals serve to degrade algae and pathogens by weakening cell integrity which in turn breaks down these organics and others such as toxins, taste and odor compounds, and emerging contaminants. In certain embodiments, the nano bubbles do not rise and burst like normal bubbles but rather through a phenomenon known as Brownian motion.

An advantage of the nanobubble generator 304 is that it increases the amount of gas in the water by introducing two forms of gas into the water: dissolved gas and nano bubbles. Thus, in certain embodiments, if oxygen is used as the gas, and water as the liquid, the nano bubble generator 304 is capable of producing greater than 85% oxygen transfer efficiency regardless of the water depth. In certain embodiments, the nano bubbles transfer gas 30 times more efficiently than traditional means and can evenly oxygenate the flowing water. In certain embodiments, this results in dissolved oxygen levels produced in the water that are both stable and uniform. In certain embodiments, off-gassing is minimalized due to the strength and longevity of the nano bubbles. In certain embodiments, the gas generator 302 is designed so that any off-gassing does not exceed UL 1563 Standard for Electric Spas, Equipment Assemblies, and Associated Equipment.

Incorporating a nano bubble generator 304 into the plumbing system 200 of an immersion structure 100 is highly advantageous. In addition to the capabilities mentioned above, nano bubbles scrub while they circulate to clean the plumbing system 200. In certain embodiments, the nano bubbles act like hard particles in flowing liquids to break apart biofilm, remove scum lines, clean pipes, and/or allow longer filter 202 life. The negative charge of the nano bubbles enables the nano bubbles to bond to particles with the opposite charge and change the particles density which prohibits the buildup of materials that hinder efficient water sanitation.

In certain embodiments, an advantage of the water treatment system 102 is the elimination of the need for chemical sanitizers which in turn leads the immersion structure 100 to be self-maintaining. In certain embodiments, water purified by the water treatment system 102 maintains drinking level quality and decreases the time necessary to purify the water after the immersion structure 100 is used.

In certain embodiments, the water treatment system 102 maintains visibly clear water by both killing bacteria but also because nano bubbles are not visible to the naked eye. In certain embodiments, the immersion structure 100 can be odor free and generate reduced amounts of off-gas during use and when covered. Further, since fluctuations in water quality (e.g., pH, alkalinity levels, etc.) are reduced by the water treatment systems 102 disclosed herein, the need for user maintenance is also reduced. In some cases, the system 102 can help maintain a pH between at least to or about 6.5 and/or less than or equal to 7, at least to or about 6.6 and/or less than or equal to 6.9, and/or at least to or about 6.7 and/or less than or equal to 6.8. The system 102 can also help maintain alkalinity between at least 70 mg/L and/or less than or equal to 110 mg/L, at least 80 mg/L and/or less than or equal to 100 mg/L, and/or at least 85 mg/L and/or less than or equal to 95 mg/L. User intervention to balance the need for draining and filling the immersion structure 100 versus chemically shocking the water can be reduced or eliminated.

Figure 7:
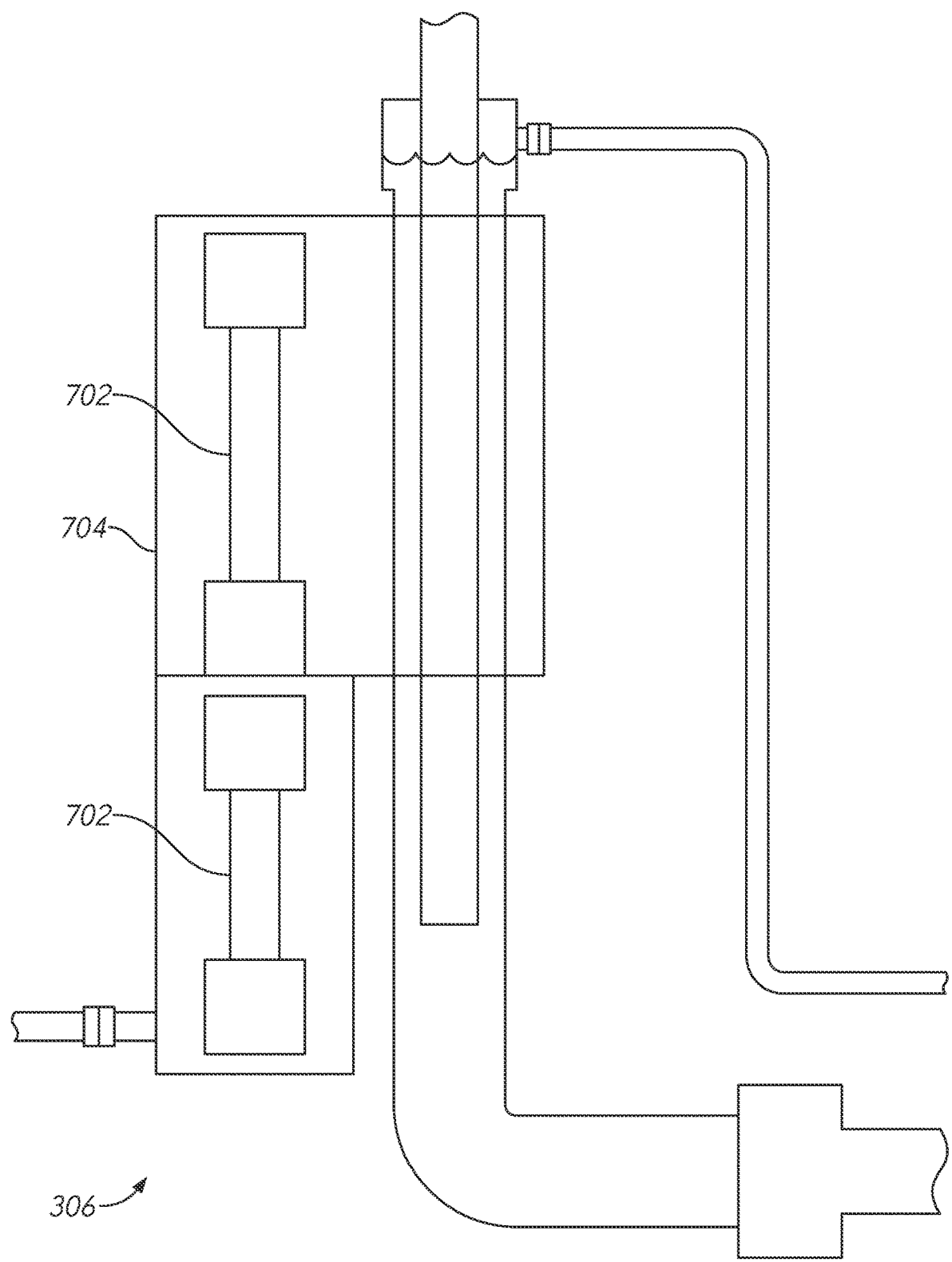
FIG. 7 is a schematic illustration of an exemplary embodiment of the UV system from FIG. 3B.

FIG. 7 is a schematic illustration of an exemplary embodiment of the UV system 306 from FIG. 3B. In certain embodiments, the UV system 306 comprises a housing 704 and one or more UV light sources 702 disposed in the housing 704. The use of UV light on the water flowing through the immersion structure 100 can clean and disinfect the water. In certain embodiments, the UV light source 702 is selected to transmit a range of wavelengths that is lethal to bacteria and micro-organisms. In certain embodiments, the UV light source 702 is a mercury vapor bulb. In certain embodiments, the UV light source 702 has a wavelength range of 250-280 nanometers. In certain embodiments, the wavelength of the UV light source 702 is approximately 260 nanometers. Other wavelengths that also kill bacteria and micro-organisms could also be used.

In certain embodiments, the UV light source 702 is selected to interact with gaseous molecules in the plumbing system 200. For example, in certain embodiments, the UV light source 702 transmits a range of wavelengths that is lethal to bacteria and micro-organisms while simultaneously separating and disassociating ozone molecules into oxygen molecules. In certain embodiments, the UV light source 702 has a UV light wavelength characteristic such that it creates ozone molecules from normal oxygen molecules. To maximize the micro-organism and ozone exposure to the light, several lights sources 702 and reflectors may be used within the system 306. In certain embodiments, the UV system 306 is located upstream of the nano bubble generator 304. In certain embodiments, the nano bubble generator 304 produces nano bubbles that contain ozone. In certain embodiments, the UV light source 702 interacts with the ozone within the water before the water reenters the nano bubble generator 304. In certain embodiments, the UV light source 702 can reduce the amount of residual ozone in the plumbing system 200 or reduce the cumulative amount of ozone within the plumbing system 200.

Figure 8:
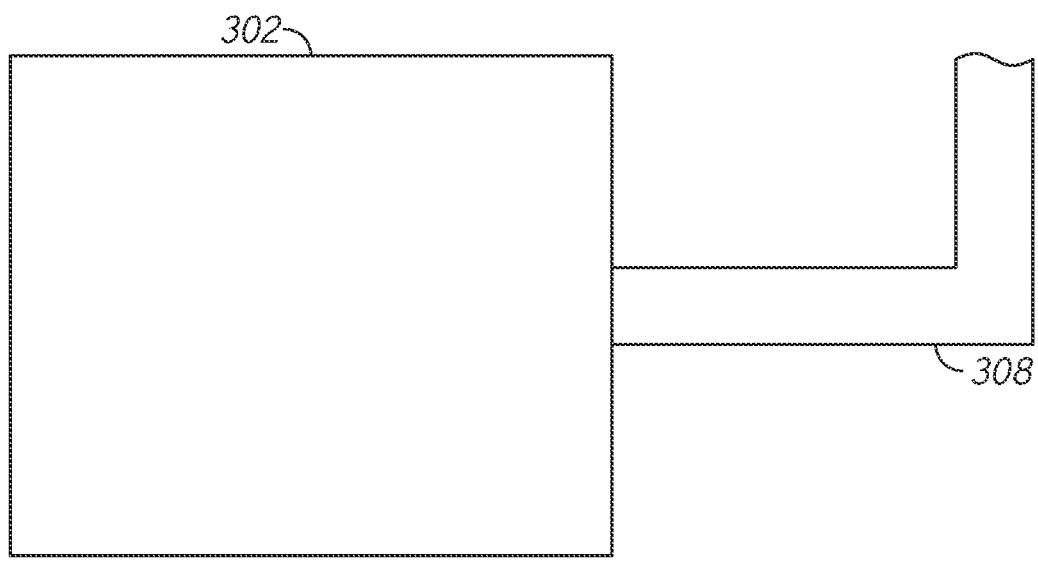
FIG. 8 is a schematic illustration of an exemplary embodiment of the gas generator from FIG. 3A.

FIG. 8 is a schematic illustration of an exemplary embodiment of the gas generator 302 from FIG. 3A. In certain embodiments, the gas generator 302 is configured to generate ozone. In certain embodiments, the gas generator 302 is in fluid communication with the gas line 308 which is in fluid communication with the tube 602 in the nano bubble generator 304. The gas generator 302 is not limited to a particular design or product, but rather includes any system that generates the desired gas or releases the desired gas. In certain embodiments, the gas generator 302 is a pressurized tank or canister full of the desired gas. In other embodiments, the gas generator 302 is a commercial gas generator. Exemplary ozone gas generators 302 can produce 40-100 mg of ozone per hour. In certain embodiments, the gas generator 302 produces no less than 40 mg per hour at no more than 1 SCFH (standard cubic feet per hour) gas flow. In some cases, the gas generator 302 produces no less than 90 mg of ozone per hour at greater than or equal to 0.3 SCFH and/or less than or equal to 1.5 SCFH gas flow, for example at greater than or equal to 0.4 SCFH and/or less than or equal to 1.2 SCFH gas flow, at greater than or equal to 0.6 SCFH and/or less than or equal to 1.0 SCFH gas flow, and/or at greater than or equal to 0.7 SCFH and/or less than or equal to 0.9 SCFH gas flow. In some cases, the gas generator 302 produces no less than 100 mg of ozone per hour at greater than or equal to 0.3 SCFH and/or less than or equal to 1.5 SCFH gas flow, for example at greater than or equal to 0.4 SCFH and/or less than or equal to 1.2 SCFH gas flow, at greater than or equal to 0.6 SCFH and/or less than or equal to 1.0 SCFH gas flow, and/or at greater than or equal to 0.7 SCFH and/or less than or equal to 0.9 SCFH gas flow. Optimal gas flow can beneficially prevent the bubbles generated by the bubble generator 304 from bursting. The nano-bubbles can have a density between at least 0.2% and/or less than or equal to 0.7% ozone by weight, at least 0.3% and/or less than or equal to 0.6% ozone by weight, and/or at least 0.4% and/or less than or equal to 0.5% ozone by weight. The density described herein beneficially ensure proper bubble generation and treatment.

The use of ozone as the desired gas can enhance cleaning and disinfecting of the water while producing minimal off-gassing as ozone is an effective sanitizer because of its strong oxidizing properties.

Figure 9:
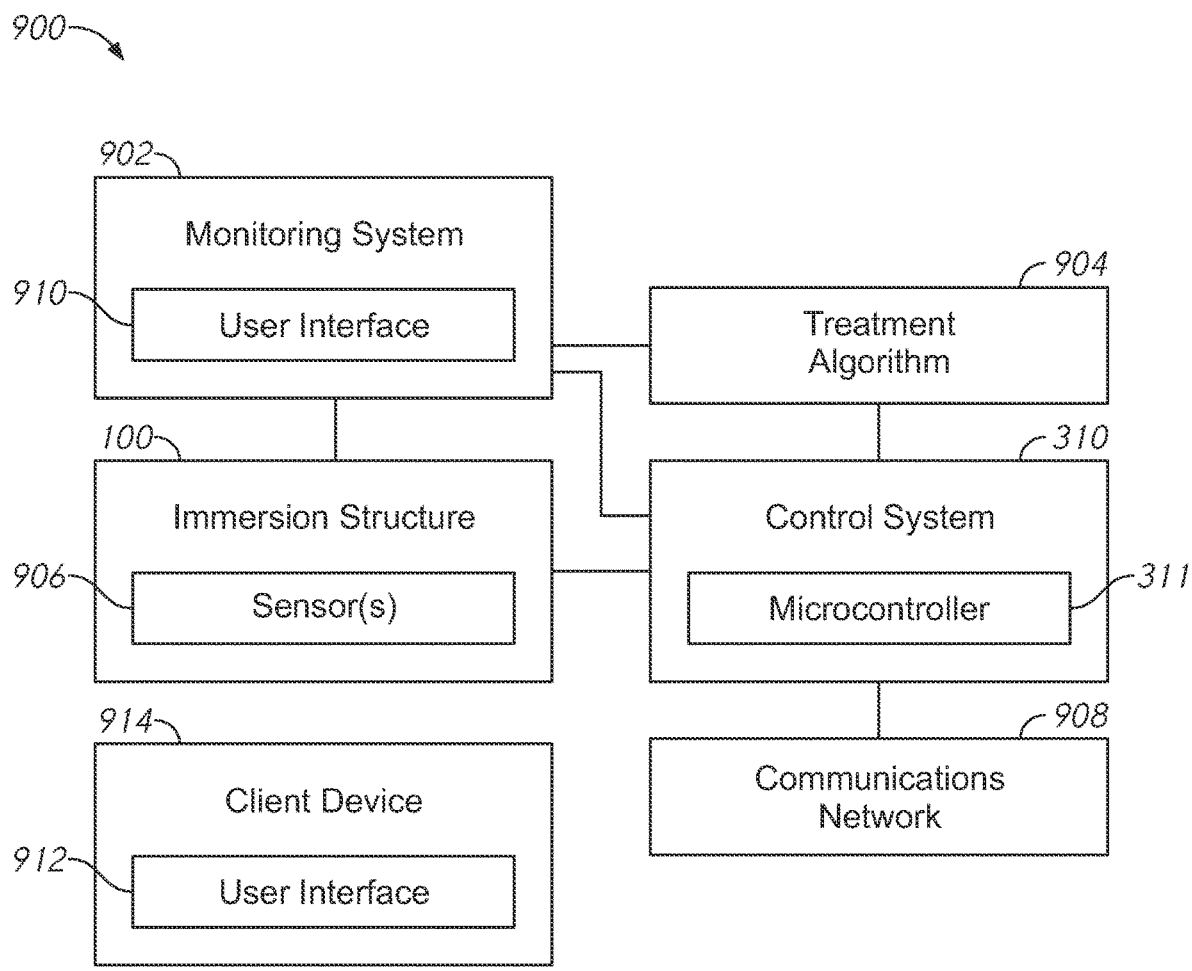
FIG. 9 illustrates a water quality monitoring and treatment system being used to control (e.g., water treatment, operational parameters, cleaning boost, part replacement, etc.) aspects of the immersion structure.

FIG. 9 illustrates a water quality monitoring and treatment system 900 being used to control (e.g., water treatment, operational parameters, cleaning boost, part replacement, etc.) aspects of the immersion structure 100. In certain embodiments, the system 900 provides proper treatment by adding one or more additives to the water so that the quality of the water is maintained within its desired tolerance(s), depending on the number and type of parameters measured. In certain embodiments, the system 900 includes a monitoring system 902, a treatment algorithm 904, and a control system 310. The components of the system 900 do not necessarily represent distinct components, rather, this schematic is intended to convey functionality of the system. Thus, while system 900 can be composed of components that correspond in a one-to-one manner to the functionality blocks of FIG. 9, this need not be so. For example, the treatment algorithm 904 need not be disposed in a stand-alone device; it can be in any suitable form, such as a set of software instructions executed onboard a component of the monitoring system 902, or onboard another component or device, such as a computing device (e.g., webserver, smartphone, home computer, laptop computer, tablet computer, desktop computer, etc.) located remotely from the immersion structure 100.

In certain embodiments, the monitoring system 902 is designed and configured to monitor (e.g., measure repeatedly) at least one parameter indicative of the quality of water in the immersion structure 100. Though the number of measured parameters can be as few as one, in many applications, such as spa monitoring applications, the number of measured parameters will be greater than one. The monitoring system 902 can monitor each of the parameters using one or more suitable sensors 906, such as one or more chemical indicators, one or more electrodes, one or more chemical probes, among others, and any combination thereof.

In certain embodiments, the sensor 906 is wireless and floats in the basin 106. In certain embodiments, the sensor 906 is integrated into the plumbing system 200.

In certain embodiment, the monitoring system 902 generates one or more outputs indicative of the measurement(s) taken by the sensor 906 and outputs the resulting signal(s) to the control system 310. In certain embodiments, the monitoring system 902 takes the measurement(s) from the sensors 906 and outputs the corresponding output multiple times (e.g., periodically or at differing intervals) over a given time period. Each output can be in any suitable form. The type of output used in a particular implementation may depend, for example, on whether the control system 310 is implemented within the monitoring system 902 or outside of the monitoring system 902. For example, the control system 310 can be implemented on a remote device, such as a client device 914 (e.g., laptop computer, tablet computer, webserver, smartphone, desktop computer, etc.).

In certain embodiments, the monitoring system 902 generates data containing information regarding readings of the one or more parameters and sends the data to the control system 310 via communications network 908. The control system 310, which can reside on one or more computing systems, for example, on one or more webservers, one or more client devices 914 (e.g., tablets computers, laptop computers, smartphones, etc.) or other computing system in data communication with communications network 908, processes the data. In certain embodiments, the data is displayed via a user interface 910 to a user.

In certain embodiments, the treatment algorithm 904 is designed and configured to determine whether or not any one or more of the measured parameters are out of acceptable range. In certain embodiments, the control system 310 adds one or more additives to the water with the goal of restoring the one or more out-of-range parameters to the corresponding respective acceptable ranges.

For example, in certain embodiments, the treatment algorithm 904 and/or the control system 310 measures and adjusts water chemistry parameters (e.g., pH, alkalinity, etc.). In certain embodiments, the treatment algorithm 904 and/or the control system 310 measures and informs/notifies the user of the need to balance the water chemistry parameters (e.g., pH, alkalinity, etc.). In certain embodiments, the treatment algorithm 904 and/or the control system 310 provides instructions on how the user can balance the water chemistry parameters (e.g., pH, alkalinity, etc.).

In certain embodiments, an error may occur when the control system 310 determines a level of current being drawn by the nano bubble generator 304 drops below a predetermined or preset level. In certain embodiments, the treatment algorithm 904 and/or the control system 310 informs or notifies the user that the nano bubble generator 304 is not working properly or is not working at an optimum level.

In certain embodiments, the treatment algorithm 904 can employ machine learning modeling along with predictive algorithms to determine rules, where machine learning modeling and predictive algorithms include but are not limited to: supervised and unsupervised algorithms for regression and classification. Specific classes of algorithms include, for example, Artificial Neural Networks (Perceptron, Back-Propagation, Convolutional Neural Networks, Recurrent Neural networks, Long Short-Term Memory Networks, Deep Belief Networks), Bayesian (Naive Bayes, Multinomial Bayes and Bayesian Networks), clustering (k-means, Expectation Maximization and Hierarchical Clustering), ensemble methods (Classification and Regression Tree variants and Boosting), instance-based (k-Nearest Neighbor, Self-Organizing Maps and Support Vector Machines), regularization (Elastic Net, Ridge Regression and Least Absolute Shrinkage Selection Operator), and dimensionality reduction (Principal Component Analysis variants, Multidimensional Scaling, Discriminant Analysis variants and Factor Analysis).

In certain embodiments, the control system 310 can use the rules developed (without or without machine learning) between features and one or more parameters to automatically determine operation profiles for the immersion structure 100 that correspond to the desired range. The control system 310 can also use the one or more operational profiles to control or change settings of the immersion structure 100 including but not limited to parameters for components (e.g., the gas generator 302, the nano bubble generator 304, the UV system 306, and the like).

In certain embodiments, the treatment algorithm 904 may communicate treatment instructions to the control system 310 in any manner suited to the implementation. The treatment algorithm 904 can be implemented in any suitable manner, such as any one of the manners described in this disclosure.

In certain embodiments, the system 900 is implemented over a communications network 908. In certain embodiments, the system 900 comprises wired communications links, wireless communications links, or both. Examples of a communications network include, but are not limited to, a local area network, a wide area network, a cellular telecommunications network, and a global network (e.g., the Internet), other network type, and any combination thereof. In certain embodiments, the system 900 communicates via Modbus (or any other communication protocol) to one or more IoT devices.

It is noted that the processing and displaying of data and data derived therefrom through processing by the control system 310 can be distributed in a webserver/client context. For example, the webserver may provide some initial processing of the data while a client device 914, for example, via a smartphone "app" (i.e., a software application), receives the processed data from the webserver and uses that data to generate one or more suitable graphical displays on the client device 914 representing, for example, the data.

Figure 10:
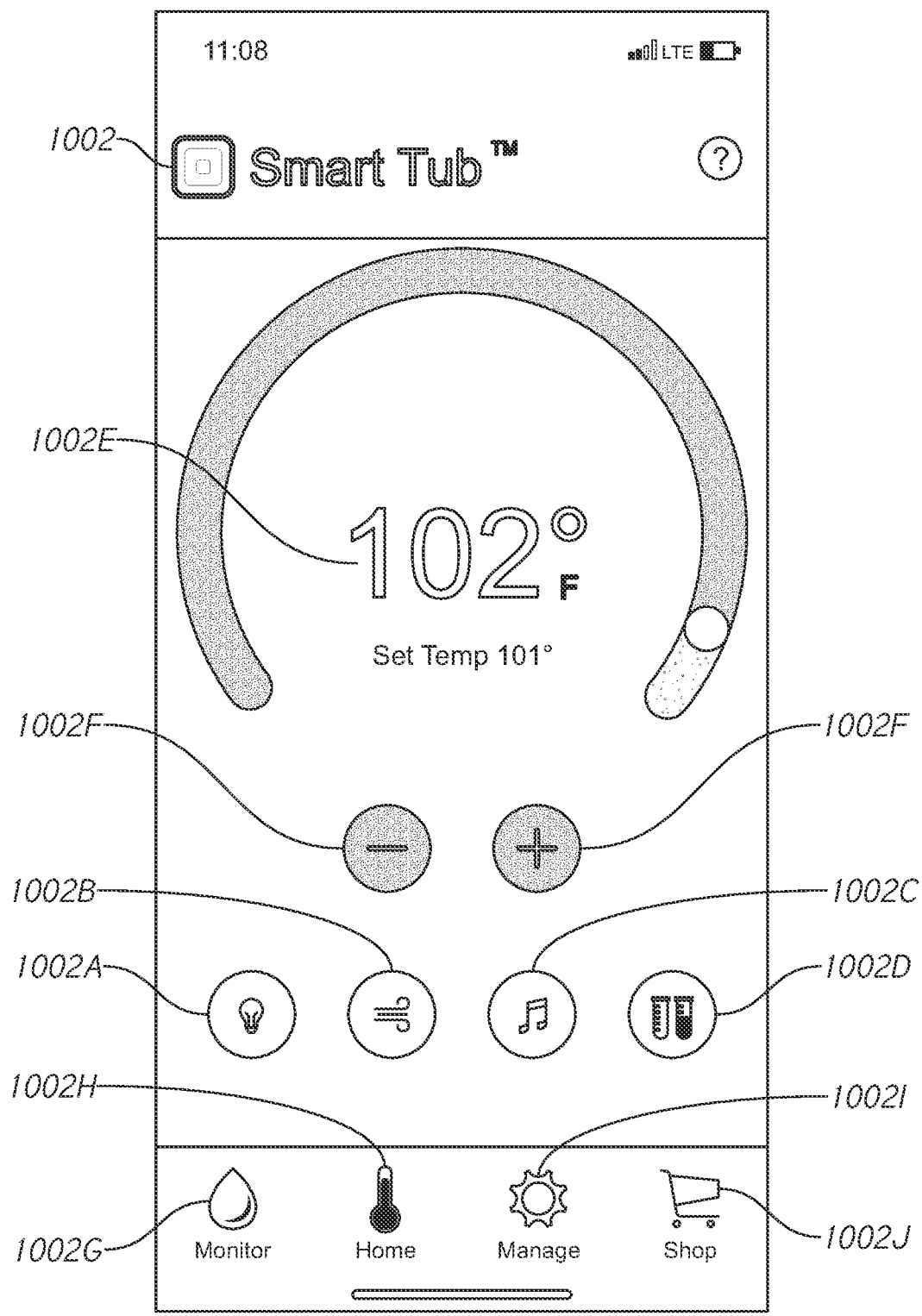
FIG. 10 illustrates an exemplary display of data on the user interface of the client device.

FIG. 10 illustrates an exemplary display of data on the user interface 912 of the client device 914. In certain embodiments, the displayed data is sensed by the one or more sensors 906. In the illustrated embodiment, below the app title 1002 can be one or more statuses 1002A-D. For example, the display can include one or more icons indicating the status of one or more lights 1002A for the immersion structure 100, indicating the status of one or more jets 1002B for the immersion structure 100, indicating the status of music 1002C for the immersion structure 100, and/or indicating the status of the water chemistry 1002D for the immersion structure 100.

In certain embodiment, the user interface 912 can display a temperature 1002E of water within the immersion structure 100. Temperature controls 1002F can be provided for the user to remotely adjust the temperature 1002E. In certain embodiments, the display of data includes icons for monitor 1002G, home 1002H, manage 1002I, and/or shop 1002J. The icons may allow the user to navigate to other icons and/or pages. The exemplary displayed data can also include buttons for navigation to other pages of the app. The appearance and arrangement of the displayed data is exemplary only; in embodiments, these features and others may be rearranged or provided with differing appearances, colors, brightness and/or functionality.

Figure 11:
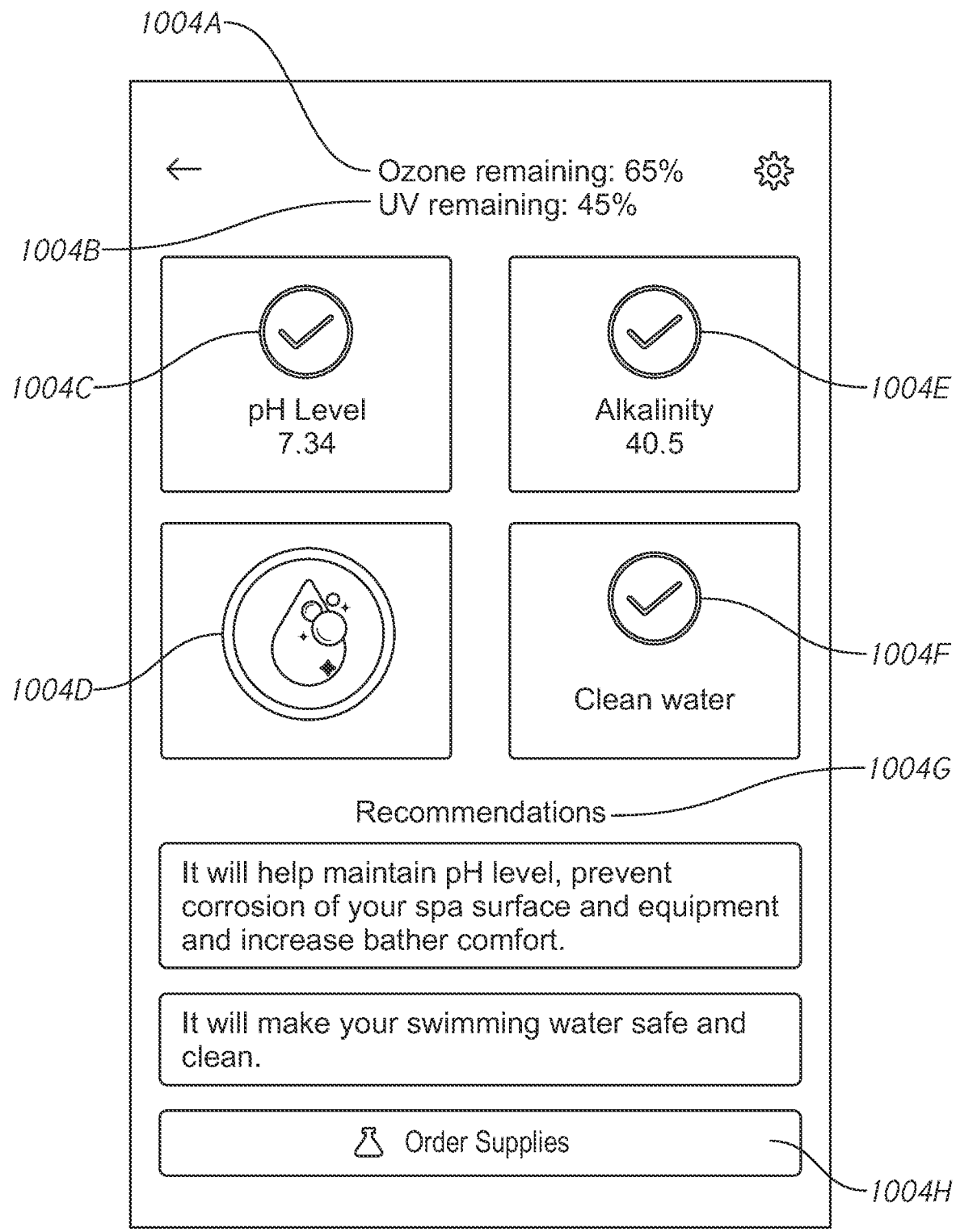
FIG. 11 illustrates another exemplary display of data on the user interface of the client device.

FIG. 11 illustrates an exemplary display of data on the user interface 912 of the client device 914. In certain embodiments, the system 900 indicates a remaining life for one or more components of the immersion structure 100. For example, in certain embodiments, the display of data includes status of the ozone remaining 1004A. In certain embodiments, the system 900 provides a counter of days of life remaining for the gas generator 302. In certain embodiments, the display of data includes status of the UV remaining 1004B. In certain embodiments, the display of data includes status of the pH level 1004C. In certain embodiments, the display of data includes status of the alkalinity 1004E. In certain embodiments, the display of data includes an icon for adjusting the pH level 1004C. In certain embodiments, the display of data includes an icon for adjusting the alkalinity 1004E.

In certain embodiments, the display of data includes an icon for a cleaning boost 1004D. In certain embodiments, the system 900 selects from preset durations of time for the cleaning boost 1004D. In certain embodiments, the preset durations of time are based at least in part on past user usage. In certain embodiments, preset consumer usage profiles (e.g., light user, heavy user, etc.) are relied on, at least in part, by the control system 310 to operate the immersion structure 100. For example, the control system 310 can adjust the run time of components (e.g., the nano bubble generator 304) of the immersion structure 100 based at least in part on the user profile without user intervention.

In certain embodiments, the system 900 employs an auto schedule. In certain embodiments, the auto schedule enhances cleaning cycles to ensure the water in the immersion structure 100 is always ready for the user.

In certain embodiments, the display of data includes a status of the water 1004F. In certain embodiments, the status of the water indicates the completion of the daily scheduled cleaning cycle and shows the user they have "clean water" and the basin 106 is "ready to use."

In certain embodiments, the display of data includes one or more recommendations 1004G for the user. For example, in certain embodiments, the system 900 indicates to the user when a part needs to be replaced. For example, in certain embodiments, the system 900 indicates when to replace the filter 202. In this way, the system 900 can monitor the remaining life of the immersion structure 100 core components (e.g., the gas generator 302, the nano bubble generator 304, the compressor 406, and/or the UV system 306) and prompt the user when a component needs to be replaced. In certain embodiments, the system 900 prompts the user when the remaining life is low and the component should be ordered. In certain embodiments, the components of the immersion structure 100 are designed for an average life of 2 years of operation based on 12 hours of daily operation as assumed "normal" use.

In certain embodiments, the system 900 indicates to the user when a consumable needs to be replaced. For example, in certain embodiments, the system 900 indicates when to replace the one or more containers containing the additives. In certain embodiments, the system 900 can monitor the remaining amount of the additive in the container (directly or indirectly) and prompt the user when the container needs to be replaced. In certain embodiments, the system 900 prompts the user when the remaining amount is low and a new container should be ordered. In this way, the system 900 can create alerts and send reminders to the user to replace the consumable. Once the new container is received, the user can simply couple the container to a port on the water treatment system 102 so as to allow the additive in the container to be injected into the nano bubbles. In this way, when the additive in the container is consumed, the user can simply disengage the empty container from the port and then connect a new filled container.

Referring back to FIG. 9, in certain embodiments, the display of data includes an icon to order supplies 1004H. In certain embodiments, each icon may also function as a button that can be activated to take the app to an order supply page for the corresponding component. In certain embodiments, the user can order the core components directly from the manufacturer via the user interface 912 of the client device 914. As explained above, in certain embodiments, the operational status of the system 900 is monitored remotely. In certain embodiments, a third party provides servicing needs (e.g. water concierge service) to maintain the immersion structure 100 without the user having to order components. In this way, the third party provides the component to the user based on the remote monitoring of the immersion structure 100.

In certain embodiments, the client device 914 receives unprocessed data, in which case a software application on the client device 914 may use the unprocessed data directly to create suitable graphical displays and/or allow a user to use the unprocessed data in another way. For example, the client device 914 can receive data directly, via a wired or wireless data connection, and the client device 914 may include a software application for processing the data, or not, and use either the processed data or unprocessed data, or both, in any suitable manner, such as for producing graphical displays or transferring the data to a spreadsheet or other program for detailed analysis, among many other possibilities.

In certain embodiments, the control system 310 itself may provide a relatively high level of data processing, such that the data is already processed for high level use, such as graphical display by the client device 914.

The treatment algorithm 904 can be embodied and realized in any of a number of different ways. In addition to being located at various locations within the system 900, the treatment algorithm 904 can be configured to provide treatment instructions for manual treatment or automated treatment, or both.

Manual treatment can be performed in any one or more of a variety of ways. For example, if the control system 310 is manually controllable, i.e., requires a human operator to control the treatment, the user interface 910 can display certain operational parameters and/or an indication of the amount of an additive that the user needs to cause the control system 310 to dispense. For remote operation, the user instructs the control system 310, via the user interface 912. In this way, the system 900 can be monitored and/or controlled from virtually any location having access to communications network 908.

Depending on the spacing of the monitoring system 902 and the control system 310 from one another, they can be in data communication via any suitable means, such as wired communication or wireless communication. Examples of suitable wireless communication includes Wi-Fi, Bluetooth, short-range radio communication, and infrared communication, among others.

Although certain embodiments and examples are disclosed herein, inventive subject matter extends beyond the examples in the specifically disclosed embodiments to other alternative embodiments and/or uses, and to modifications and equivalents thereof. While we have described and illustrated in detail embodiments of a water treatment system that includes a nano bubble generator, it should be understood that our inventions can be modified in both arrangement and detail. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Although the water treatment system has been disclosed in the context of certain embodiments and examples, it will be understood by those skilled in the art that the water treatment system and subassemblies extend beyond the specifically disclosed embodiments to other alternative embodiments and/or uses of the embodiments and certain modifications and equivalents thereof. Accordingly, it is intended that the scope of the water treatment system herein-disclosed should not be limited by the particular disclosed embodiments described above but should be determined only by a fair reading of the claims that follow.

What is claimed is:

1. A self-maintaining hot tub or spa comprising:
a shell forming a receptacle sized and shaped to hold water; and
a plumbing system comprising a nano bubble generator in fluid communication with a gas generator, the plumbing system being configured to circulate the water between the receptacle and at least the nano bubble generator, the nano bubble generator being configured to create and inject a plurality of nano bubbles into the plumbing system to clean the water within the plumbing system, the gas generator configured to inject the plurality of nano bubbles with a gas.

2. The self-maintaining hot tub or spa of claim 1, wherein the plumbing system further comprises a UV system configured to sanitize the water before the water enters the nano-bubble generator.

3. The self-maintaining hot tub or spa of claim 1, wherein the gas has a pressure of between 3 PSIG and 12 PSIG.

4. The self-maintaining hot tub or spa of claim 1, wherein the gas is selected from the group consisting of air, oxygen, ozone, carbon dioxide, nitrogen, hydrogen, mineral gas, and combinations thereof.

5. The self-maintaining hot tub or spa of claim 1, further comprising a control system having one or more sensors configured to measure one or more of a water quality parameter or a concentration of nano bubbles in the water.

6. The self-maintaining hot tub or spa of claim 1, wherein the nano bubble generator comprises a gas-permeable tube comprising a porous sidewall having a mean pore size ranging from 0.0009 µm to 1 µm.

7. The self-maintaining hot tub or spa of claim 1, further comprising a port configured to receive an additive from a container.

8. The self-maintaining hot tub or spa of claim 1, wherein the plurality of nano bubbles have a mean diameter of less than 1 micron.

9. The self-maintaining hot tub or spa of claim 1, wherein the gas generator comprises an ozone generator, and wherein the ozone generator is configured to provide ozone to the nano bubble generator, the plurality of nano bubbles comprising the ozone.

10. The self-maintaining hot tub or spa of claim 9, wherein the ozone generator has a flow rate between 0.3 SCFH and 0.7 SCFH.

11. The self-maintaining hot tub or spa of claim 9, wherein the ozone generator provides 40 to 100 mg/hr of ozone.

12. The self-maintaining hot tub or spa of claim 1, wherein the gas comprises one or more additives.

13. The self-maintaining hot tub or spa of claim 12, wherein the one or more additives are selected from the group consisting of minerals, nutrients, and aromatherapy scents or oils.

14. The self-maintaining hot tub or spa of claim 1, further comprising a recirculation pump configured to pump water through the nano bubble generator.

15. The self-maintaining hot tub or spa of claim 14, wherein the recirculation pump is configured to provide a flow rate between 14 gallons per minute and 20 gallons per minute.

16. The self-maintaining hot tub or spa of claim 1, further comprising a control system having one or more sensors configured to monitor performance of the nano bubble generator.

17. The self-maintaining hot tub or spa of claim 16, wherein the one or more sensors comprises a pressure sensor configured to measure a pressure of ozone entering the nano bubble generator.

18. The self-maintaining hot tub or spa of claim 17, wherein the control system is configured to issue an alert when the sensor measures a drop in the pressure, the alert indicative of a failure in water treatment.

19. The self-maintaining hot tub or spa of claim 17, wherein the control system is configured to issue an alert when the pressure falls below 9 PSI.

20. The self-maintaining hot tub or spa of claim 1, further comprising a control system configured to control operation of the nano bubble generator and the gas generator in one or more filtration cycle modes.

21. The self-maintaining hot tub or spa of claim 20, wherein the at least one cycle mode comprises a continuous mode in which the nano bubble generator and the gas generator are on for a consecutive period of time, wherein the consecutive period of time is less than twenty-four hours.

22. The self-maintaining hot tub or spa of claim 20, wherein the at least one mode comprises a non-continuous mode in which the nano bubble generator and the gas generator are turned on and off periodically.

\* \* \* \* \*